US012006768B2

(12) United States Patent
Kirby

(10) Patent No.: US 12,006,768 B2
(45) **Date of Patent: *Jun. 11, 2024**

(54) INTERLOCKING PIVOTABLE FASCIA FOR MOTORIZED WINDOW TREATMENT

(71) Applicant: LUTRON TECHNOLOGY COMPANY LLC, Coopersburg, PA (US)

(72) Inventor: David A. Kirby, Zionsville, PA (US)

(73) Assignee: LUTRON TECHNOLOGY COMPANY LLC, Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/174,792

(22) Filed: Feb. 27, 2023

(65) Prior Publication Data

US 2023/0220728 A1 Jul. 13, 2023

Related U.S. Application Data

(63) Continuation of application No. 17/327,255, filed on May 21, 2021, now Pat. No. 11,608,682, which is a (Continued)

(51) Int. Cl.
*E06B 9/42* (2006.01)
*E06B 9/72* (2006.01)
*E06B 9/17* (2006.01)

(52) U.S. Cl.
CPC .................. *E06B 9/72* (2013.01); *E06B 9/42* (2013.01); *E06B 9/17007* (2013.01)

(58) Field of Classification Search
CPC ..... E06B 9/72; E06B 9/70; E06B 9/42; E06B 9/24; E06B 9/323; E06B 9/17007; E06B 9/17015; E06B 9/17023; E06B 9/68
See application file for complete search history.

(56) References Cited

U.S. PATENT DOCUMENTS 2,802,523 A 8/1957 Anderle
4,531,562 A * 7/1985 Swanson .................. E06B 9/24 160/DIG. 7

(Continued)

OTHER PUBLICATIONS

Outwater Plastics Industries, Inc. & Architectural Products by Outwater, LLC, Outwater 2013 Master Catalog, 2013, cover page, p. 146, Catalog 42, 2013.

*Primary Examiner* — Johnnie A. Shablack
(74) *Attorney, Agent, or Firm* — Duane Morris LLP

(57) ABSTRACT

A battery-powered, motorized window treatment may include a fascia that pivots between a conceal position wherein the fascia covers a window treatment assembly and a battery compartment, and an expose position wherein the fascia does not cover the battery compartment. The fascia may be a two part fascia that includes an arm and a cover that pivots relative to the arm when the battery compartment is operated between respective opened and closed positions. The arm may be attached to the battery compartment such that the arm remains in a fixed orientation relative to the battery compartment. The arm and the cover may define complementary pivotally interlocking connectors that define a pivot axis about which the cover may pivot relative to the arm. The fascia may be configured to generate a perceptible indication when the fascia pivots into the conceal position, and/or when the fascia pivots into the expose position.

20 Claims, 10 Drawing Sheets

Related U.S. Application Data continuation of application No. 16/153,918, filed on Oct. 8, 2018, now Pat. No. 11,015,389, which is a continuation of application No. 14/530,730, filed on Nov. 1, 2014, now Pat. No. 10,094,169.

(56) References Cited

U.S. PATENT DOCUMENTS

| | | | | |
|---|---|---|---|---|
| 4,718,471 | A | 1/1988 | Kraeutler | |
| 4,885,219 | A | 12/1989 | Miller | |
| 5,134,347 | A | 7/1992 | Koleda | |
| 5,391,967 | A | 2/1995 | Domel et al. | |
| 5,467,266 | A | 11/1995 | Jacobs et al. | |
| 5,793,174 | A | 8/1998 | Kovach et al. | |
| 5,804,332 | A | 9/1998 | Shimizu et al. | |
| 5,848,634 | A | 12/1998 | Will et al. | |
| 5,883,480 | A | 3/1999 | Domel et al. | |
| 6,145,165 | A | 11/2000 | Torcato | |
| 6,230,782 | B1 | 5/2001 | Reichert | |
| 6,369,530 | B2 | 4/2002 | Kovach et al. | |
| 6,371,192 | B1 | 4/2002 | Anderson et al. | |
| 6,433,498 | B1 | 8/2002 | Domel et al. | |
| 6,446,693 | B1 | 9/2002 | Anderson et al. | |
| 6,516,858 | B1 | 2/2003 | Anderson et al. | |
| 6,812,662 | B1 | 11/2004 | Walker | |
| 6,983,783 | B2 | 1/2006 | Carmen, Jr. et al. | |
| 7,389,806 | B2 | 6/2008 | Kates | |
| 7,401,634 | B2 | 7/2008 | Kovach et al. | |
| 7,466,090 | B2 | 12/2008 | Meewis et al. | |
| 7,517,609 | B2 | 4/2009 | Cheng | |
| 7,673,667 | B2 | 3/2010 | Domel et al. | |
| 7,719,215 | B2 | 5/2010 | Meewis et al. | |
| 7,723,939 | B2 | 5/2010 | Carmen, Jr. | |
| 7,857,030 | B2 | 12/2010 | Cheng | |
| 8,371,358 | B1 | 2/2013 | Mullet et al. | |
| 8,540,005 | B2 | 9/2013 | Baugh et al. | |
| 8,851,141 | B2 | 10/2014 | Blair et al. | |
| 8,950,461 | B2 | 2/2015 | Adams et al. | |
| 9,045,939 | B2 * | 6/2015 | Blair | E06B 9/323 |
| 9,115,537 | B2 | 8/2015 | Blair | |
| 9,447,636 | B2 * | 9/2016 | Blair | B23P 6/00 |
| 9,488,000 | B2 | 11/2016 | Kirby et al. | |
| 9,745,796 | B2 | 8/2017 | Blair et al. | |
| 9,810,020 | B2 | 11/2017 | Adams et al. | |
| 10,094,169 | B2 | 10/2018 | Kirby | |
| 10,132,116 | B2 * | 11/2018 | Kirby | E06B 9/40 |
| 10,590,700 | B2 | 3/2020 | Blair et al. | |
| 10,968,696 | B2 * | 4/2021 | Kirby | E06B 9/70 |
| 11,015,389 | B2 | 5/2021 | Kirby et al. | |
| 11,578,531 | B2 * | 2/2023 | Kirby | E06B 9/42 |
| 11,608,682 | B2 * | 3/2023 | Kirby | E06B 9/72 |
| 2003/0168187 | A1 | 9/2003 | Wen et al. | |
| 2005/0205733 | A1 | 9/2005 | Nien | |
| 2006/0118250 | A1 | 6/2006 | Jin et al. | |
| 2007/0284053 | A1 | 12/2007 | Mullet et al. | |
| 2008/0150461 | A1 | 6/2008 | Adamus et al. | |
| 2008/0260363 | A1 | 10/2008 | Carmen et al. | |
| 2009/0199975 | A1 | 8/2009 | Yeh | |
| 2009/0308543 | A1 | 12/2009 | Kates | |
| 2010/0092855 | A1 | 4/2010 | Cheng | |
| 2010/0269988 | A1 | 10/2010 | Mullet et al. | |
| 2011/0203748 | A1 | 8/2011 | Mullet et al. | |
| 2011/0203754 | A1 | 8/2011 | Mullet et al. | |
| 2011/0253320 | A1 | 10/2011 | Baugh et al. | |
| 2011/0272106 | A1 | 11/2011 | Mullet et al. | |
| 2012/0012262 | A1 | 1/2012 | Santoro et al. | |
| 2012/0031571 | A1 | 2/2012 | Mullet et al. | |
| 2012/0090787 | A1 | 4/2012 | Jones et al. | |
| 2012/0090797 | A1 | 4/2012 | Mullet et al. | |
| 2012/0225340 | A1 | 9/2012 | Mullet et al. | |
| 2012/0255689 | A1 | 10/2012 | Blair et al. | |
| 2013/0098561 | A1 * | 4/2013 | Mullet | E06B 9/50 160/39 |
| 2013/0153162 | A1 | 6/2013 | Blair et al. | |
| 2013/0306250 | A1 | 11/2013 | Mullet et al. | |
| 2014/0231032 | A1 | 8/2014 | Blair | |
| 2014/0305602 | A1 | 10/2014 | Kirby et al. | |
| 2015/0226001 | A1 | 8/2015 | Adams et al. | |
| 2015/0247362 | A1 | 9/2015 | Kirby | |
| 2015/0300079 | A1 | 10/2015 | Dallan | |
| 2016/0123076 | A1 | 5/2016 | Kirby | |
| 2017/0081916 | A1 | 3/2017 | Greening | |
| 2017/0260808 | A1 | 5/2017 | Adams et al. | |
| 2019/0040681 | A1 | 2/2019 | Kirby | |
| 2019/0085624 | A1 | 3/2019 | Kirby et al. | |

* cited by examiner

INTERLOCKING PIVOTABLE FASCIA FOR MOTORIZED WINDOW TREATMENT

CROSS-REFERENCE TO RELATED APPLICATIONS

This application is a continuation of U.S. patent application Ser. No. 17/327,255, filed May 21, 2021, which is a continuation of U.S. patent application Ser. No. 16/153,918, filed Oct. 8, 2018 (now U.S. Pat. No. 11,015,389), which is a continuation of U.S. patent application Ser. No. 14/530,730, filed on Nov. 1, 2014, entitled INTERLOCKING PIVOTABLE FASCIA FOR MOTORIZED WINDOW TREATMENT (now U.S. Pat. No. 10,094,169), the entire disclosures of which are hereby incorporated by reference.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows that the roller shade is mounted in front of.

A window treatment may be motorized. For example, a motorized roller shade may include a motor drive unit that is coupled to the roller tube to provide for tube rotation. When operated, the motor drive unit may cause the roller tube to rotate, such that the lower end of the shade fabric is raised or lowered, for example along a vertical direction. The motor drive unit of a motorized window treatment (e.g., a roller shade) may powered, for example, by an alternating current (AC) source, a direct current (DC) source, by one or more batteries, or any combination thereof.

In an example motorized roller shade, the motor drive unit, the roller tube, and a battery compartment may be retained within a housing that is mounted in front of one or more windows. Such a motorized roller shade may include a fascia that is configured to conceal components such as the motor drive unit, the roller tube, and the battery compartment. However, known motorized roller shade fasciae may require manufacturing tolerances that are difficult to realize at desirable yield levels. Further, known motorized roller shade fasciae may perform inconsistently, for instance in differing environmental conditions such as different ambient temperatures.

SUMMARY

As described herein, a battery-powered, motorized window treatment, such as a roller shade, may include a window treatment assembly, a battery compartment, and a housing that is configured to support the battery compartment and the window treatment assembly. The window treatment assembly may include a covering material (e.g., a shade fabric) and a roller tube.

The motorized window treatment may include a fascia that is operably connected to the battery compartment, such that when the battery compartment is operated to the opened position, the fascia moves away from the battery compartment, does not obstruct access to one or more batteries held by the battery compartment, and does not interfere with components of the window treatment assembly (e.g., the covering material).

The fascia may be configured to pivot between a conceal position wherein the fascia at least partially covers the window treatment assembly and the battery compartment, and an expose position wherein the fascia does not cover the battery compartment. The conceal position of the fascia may correspond to the closed position of the battery compartment. The expose position of the fascia may correspond to the opened position of the battery compartment.

The fascia may be a two part fascia that includes an arm and a cover that pivots relative to the arm when the battery compartment is operated between the opened and closed positions. The arm may be configured to attach to the battery compartment such that the arm remains in a fixed orientation relative to the battery compartment, for example as the battery compartment is operated between the opened and closed positions.

The arm may define a first connector, and the cover may define a second connector that is configured to pivotally interlock with the first connector. The first and second connectors may define a pivot axis about which the cover may pivot relative to the arm. The first connector may comprise a channel, and the second connector may comprise a projection that is configured to captively interlock within the channel such that the projection is pivotable within the channel.

The fascia may be configured to generate a perceptible indication when the fascia pivots into the conceal position. The perceptible indication may be one or both of tactile and audible. The first connector of the arm may define a first position indicator, and the second connector of the cover may define a second position indicator that is configured to interact with the first position indicator, thereby generating the perceptible indication. The first position indicator may comprise a recess, and the second position indicator may comprise a protrusion that is configured to be received in the recess.

The fascia may be configured to generate a perceptible indication when the fascia enters the expose position. The perceptible indication may be one or both of tactile and audible. The arm may define a third position indicator, and the cover may define a fourth position indicator that is configured to interact with the third position indicator, thereby generating the perceptible indication. The third position indicator may comprise a ridge, and the fourth position indicator may comprise a catch that is configured to engage with the ridge.

DETAILED DESCRIPTION

Figure 1:
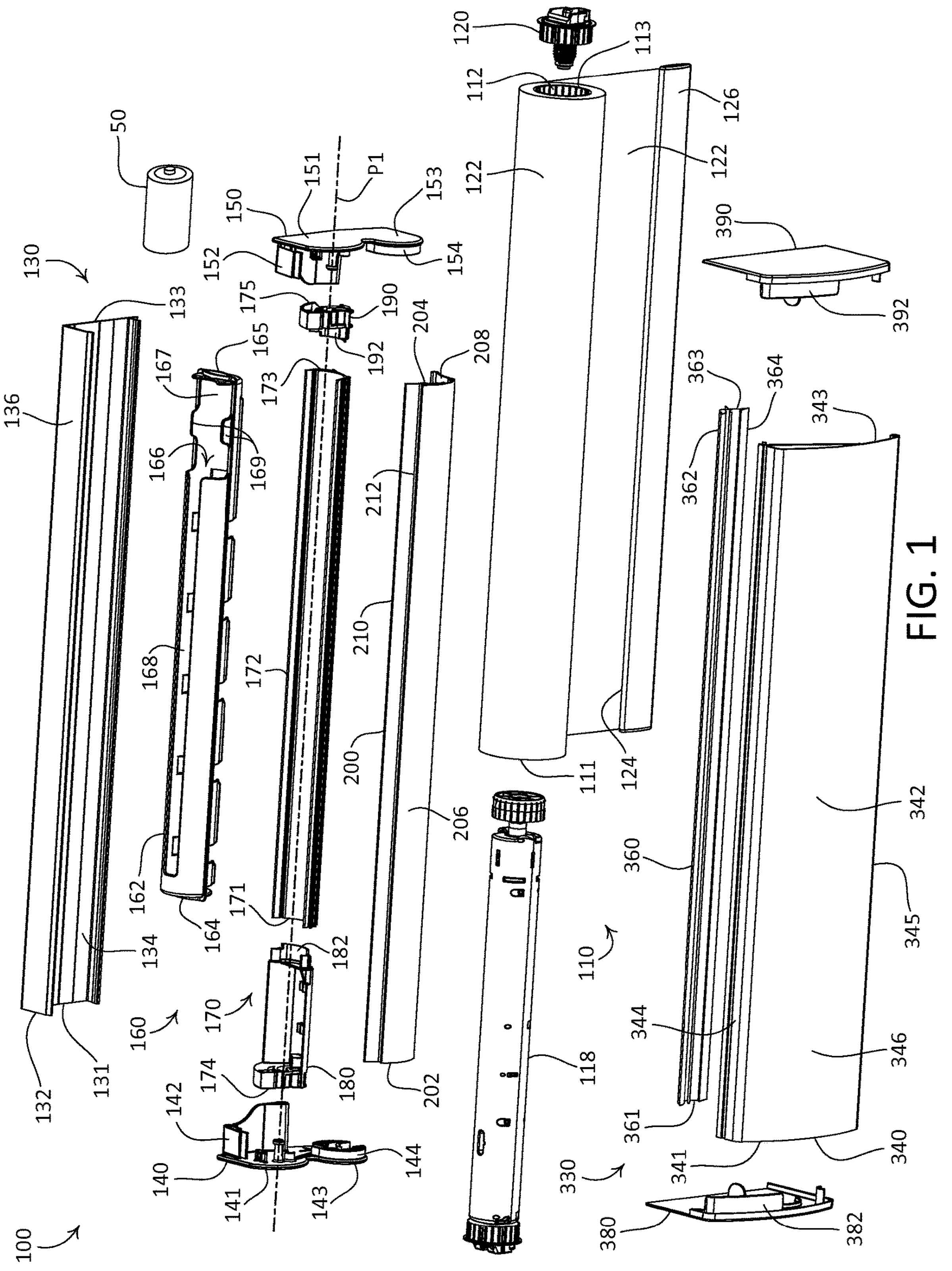
FIG. 1 is an exploded view of an example battery-powered roller shade having an integrated battery compartment and an interlocking, pivotable fascia.
Figure 2:
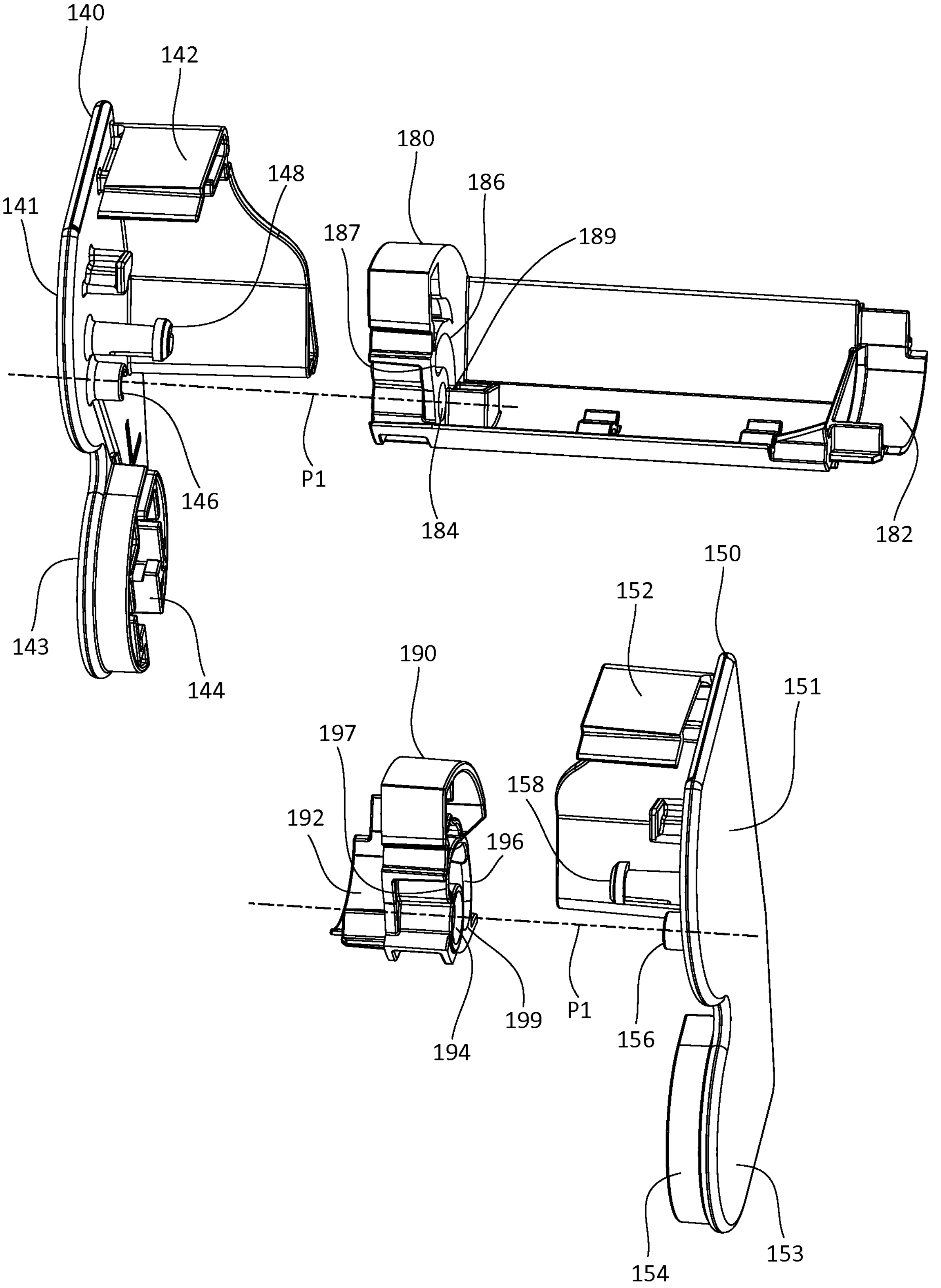
FIG. 2 is a perspective view of components of the accessible battery compartment of the example battery-powered roller shade depicted in FIG. 1.

FIGS. 1-5 depict an example battery-powered roller shade 100 that may be mounted in front of an opening, such as one or more windows, to prevent sunlight from entering a space and/or to provide privacy. The battery-powered roller shade 100 may be mounted to a structure that is proximate to the opening, such as a window frame, a wall, or other structure. As shown, the battery-powered roller shade 100 includes a window treatment assembly (e.g., a shade assembly 110), a housing 130, a battery compartment 160, and a fascia 330. The housing 130 may be configured to support the shade assembly 110 and the battery compartment 160. The housing 130 may be configured as a mounting structure and/or a support structure.

Figure 3:
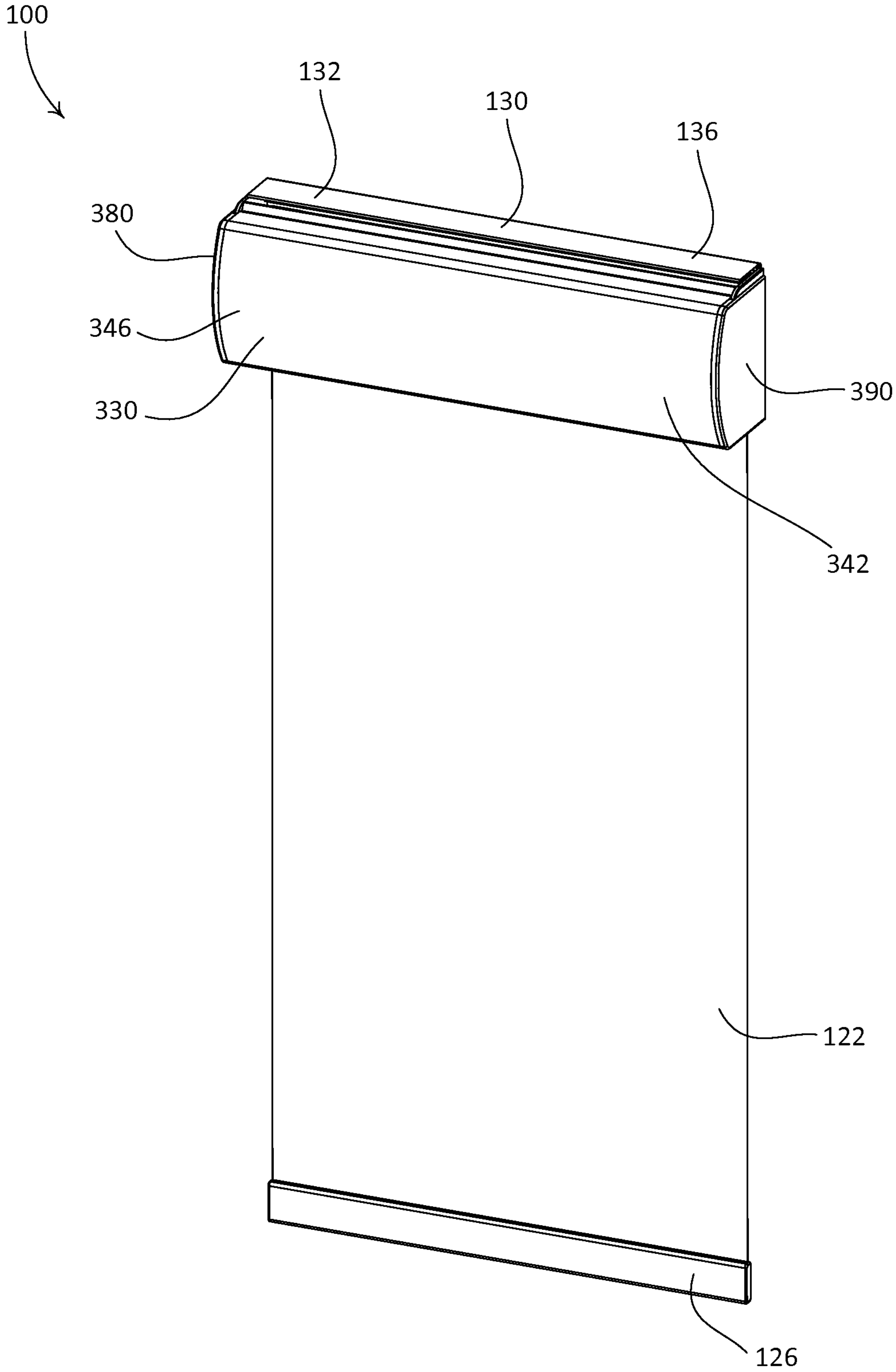
FIG. 3 is a perspective view of the example battery-powered roller shade depicted in FIG. 1, with the shade in a lowered position, the battery compartment in a closed position, and the fascia raised.
Figure 4:
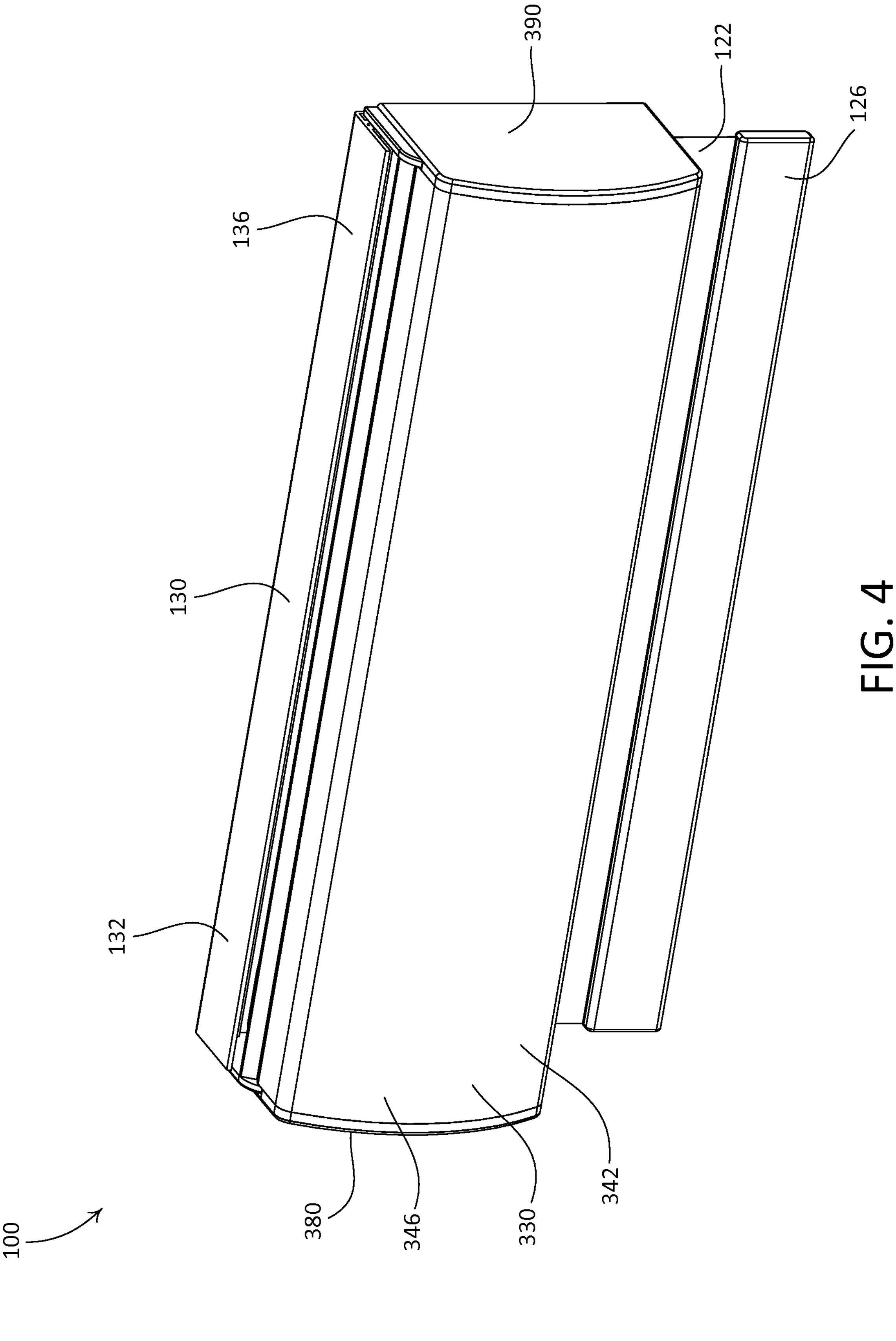
FIG. 4 is a perspective view of the example battery-powered roller shade depicted in FIG. 1, with the shade in a raised position, the battery compartment in a closed position, and the fascia raised.

The battery compartment 160 may be configured to retain one or more batteries 50. The illustrated battery 50 may be, for example, a D cell (e.g., IEC R20) battery. The battery compartment 160 may be configured to be operable between an opened position (e.g., as shown in FIG. 4) and a closed position (e.g., as shown in FIG. 3), such that one or more batteries 50 may be accessible when the battery compartment 160 is in the opened position. The battery-powered roller shade 100 may be configured such that the battery compartment 160 is mechanically bistable with respect to the opened and closed positions.

As shown, the shade assembly 110 includes a roller tube 112, a motor drive unit 118, an idler 120, a covering material (e.g., a shade fabric 122), and a hembar 126. The roller tube 112 may define a cylindrical shape that is elongate between a first end 111 and a second end 113. As shown, the roller tube 112 is hollow, and open at the first and second ends 111, 113. The roller tube 112 may be configured to at least partially receive the motor drive unit 118, and to at least partially receive the idler 120. As shown, the roller tube 112 is configured such that a portion of the motor drive unit 118 may be disposed in the first end 111, and such that a portion of the idler 120 may be disposed in the second end 113. The roller tube 112 may be made of any suitable material, such as metal. The motor drive unit 118 may be operably coupled to the roller tube 112 when the motor drive unit 118 is disposed in the first end 111 of the roller tube 112, such that operation of the motor drive unit 118 causes the roller tube 112 to rotate.

The shade fabric 122 may define an upper end (not shown) that is attached to the roller tube 112, and an opposed lower end 124. The roller tube 112 may define a central, longitudinal axis, about which the roller tube 112 may rotate. Rotation of the roller tube 112 about the longitudinal axis, for example rotation caused by the motor drive unit 118, may cause the shade fabric 122 to wind onto, or to unwind from, the roller tube 112. In this regard, the motor drive unit 118 may adjust the covering material (e.g., the shade fabric 122), for instance between raised and lowered positions. The shade fabric 122 may be referred to as a motorized shade.

Rotation of the roller tube 112 about the longitudinal axis in a first direction may cause the shade fabric 122 to unwind from the roller tube 112, for example as the shade fabric 122 is operated to a lowered position relative to an opening (e.g., a window). FIG. 3 depicts the battery-powered roller shade 100, with the shade fabric 122 in a lowered position. Rotation of the roller tube 112 about the longitudinal axis in a second direction that is opposite the first direction may cause the shade fabric 122 to wind onto the roller tube 112, for example as the shade fabric 122 is operated to a raised position relative to the opening. FIG. 4 depicts the battery-powered roller shade 100, with the shade fabric 122 in a raised position. The shade fabric 122 may be made of any suitable material, or combination of materials. For example, the shade fabric 122 may be made from one or more of "scrim," woven cloth, non-woven material, light-control film, screen, or mesh. The hembar 126 may be attached to the lower end 124 of the shade fabric 122, and may be weighted, such that the hembar 126 causes the shade fabric 122 to hang (e.g., vertically) in front of one or more windows.

The motor drive unit 118 may be configured to enable control of the rotation of the roller tube 112, for example by a user of the battery-powered roller shade 100. For example, a user of the battery-powered roller shade 100 may control the motor drive unit 118 such that the shade fabric 122 is moved to a desired position. The motor drive unit 118 may include a sensor that monitors a position of the roller tube 112. This may enable the motor drive unit 118 to track a position of the shade fabric 122 relative to respective upper and lower limits of the shade fabric 122. The upper and lower limits may be specified by an operator of the battery-powered roller shade 100, and may correspond to the raised and lowered positions of the shade fabric 122, respectively.

The motor drive unit 118 may be manually controlled (e.g., by actuating one or more buttons) and/or wirelessly controlled (e.g., using an infrared (IR) or radio frequency (RF) remote control unit). Examples of motor drive units for motorized roller shades are described in greater detail in U.S. Pat. No. 6,983,783, issued Jan. 10, 2006, entitled "Motorized Shade Control System," U.S. Pat. No. 7,839,109, issued Nov. 23, 2010, entitled "Method Of Controlling A Motorized Window Treatment," U.S. Patent Application Publication No. 2012/0261078, published Oct. 18, 2012, entitled "Motorized Window Treatment," and U.S. Patent Application Publication No. 2013/0153162, published Jun. 20, 2013, entitled "Battery-Powered Motorized Window Treatment Having A Service Position," the entire contents of each of which are incorporated herein by reference. It should be appreciated, however, that any motor drive unit or drive system may be used to control the roller tube 112.

The battery-powered roller shade 100 may include an antenna (not shown) that is configured to receive wireless signals (e.g., RF signals from a remote control device). The antenna may be in electrical communication with a wireless communication circuit (e.g., an RF transceiver) in the motor drive unit 118 (e.g., via a control circuit or PCB), such that one or more wireless signals received from a remote control unit may cause the motor drive unit 118 to move the shade fabric 122 (e.g., between the lowered and raised positions). The antenna may be integrated with (e.g., pass through, be enclosed within, and/or be mounted to) one or more of the shade assembly 110, the housing 130, the battery compartment 160, or respective components thereof.

As shown, the housing 130 includes a rail 132, a first housing bracket 140, and a second housing bracket 150. The illustrated rail 132 is elongate between a first end 131 and an opposed second end 133. The rail 132, the first housing bracket 140, and the second housing bracket 150 may be configured to attach to one another in an assembled configuration. For example, the first housing bracket 140 may be configured to be attached to the first end 131 of the rail 132, and the second housing bracket 150 may be configured to be attached to the second end 133 of the rail 132. As shown, the first housing bracket 140 defines an attachment member 142 that is configured to engage the first end 131 of the rail 132, and the second housing bracket 150 defines an attachment member 152 that is configured to engage the second end 133 of the rail 132. It should be appreciated that the rail 132, the first housing bracket 140, and the second housing bracket 150 are not limited to the illustrated attachment members.

One or more of the rail 132, the first housing bracket 140, or the second housing bracket 150, may be sized for mounting to a structure. For example, the rail 132 may be sized such that, with the first and second housing brackets 140, 150 attached to the rail 132, the rail 132 may be mounted to a structure in an opening (e.g., to a window frame). In such an example configuration, the rail 132 may define a length, for example as defined by the first and second ends 131, 133, such that the housing 130 may fit snugly in a window frame (e.g., with little clearance between the first and second housing brackets 140, 150 and adjacent structure of a window frame). This configuration may be referred to as an internal mount configuration. In another example, the rail 132 may be sized such that, with the first and second housing brackets 140, 150 attached to the rail 132, the rail 132 may be mounted to a structure above an opening (e.g., to a surface above a window). In such an example configuration, the rail 132 may define a length that is substantially equal to (e.g., slightly longer than) a width of the window opening. It should be appreciated, however, that the battery-powered roller shade 100 is not limited to these example mounting configurations.

Figure 5:
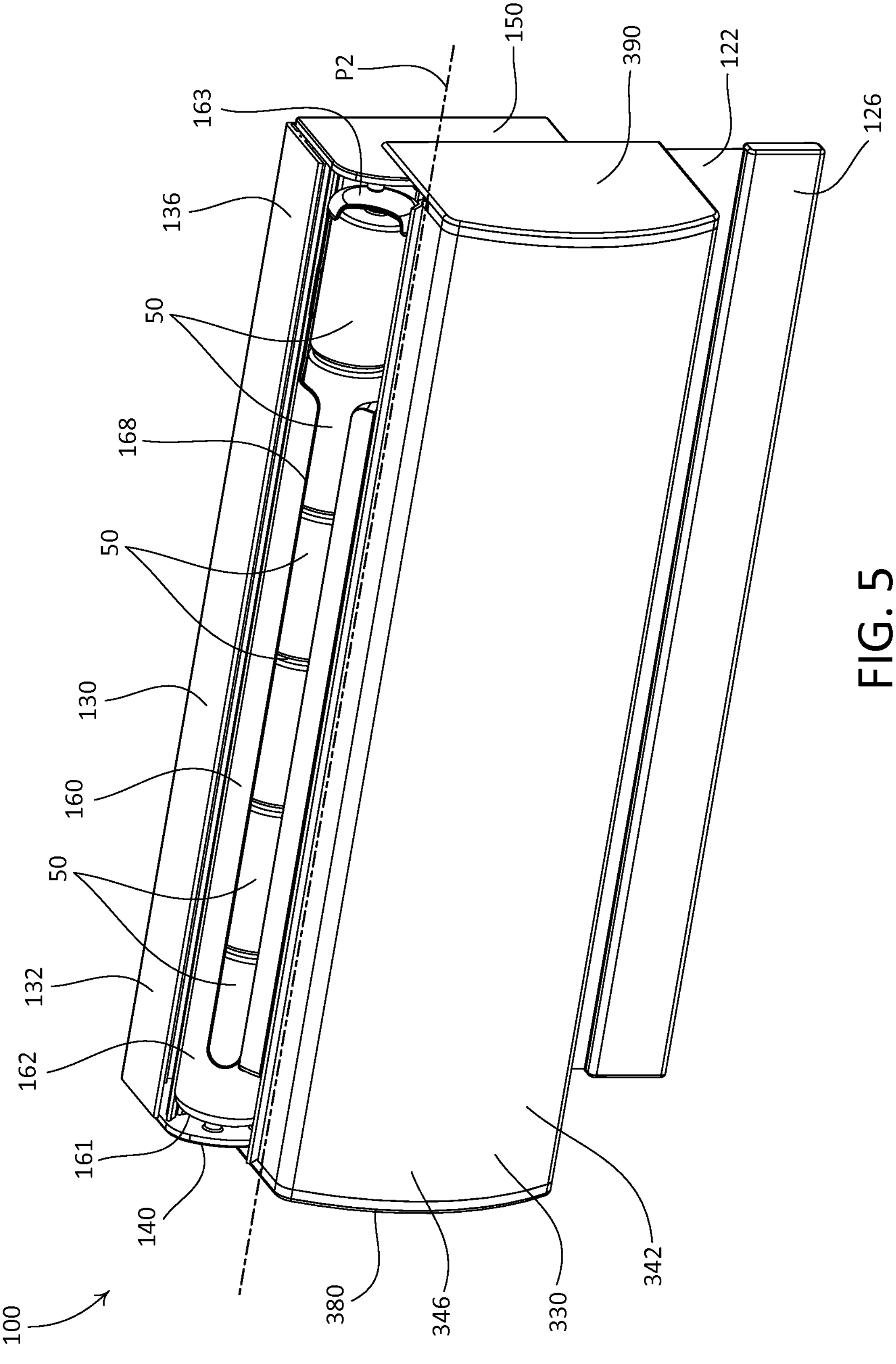
FIG. 5 is a perspective view of the example battery-powered roller shade depicted in FIG. 1, with the shade in a raised position, the battery compartment in an opened position, and the fascia lowered.
Figure 6A:
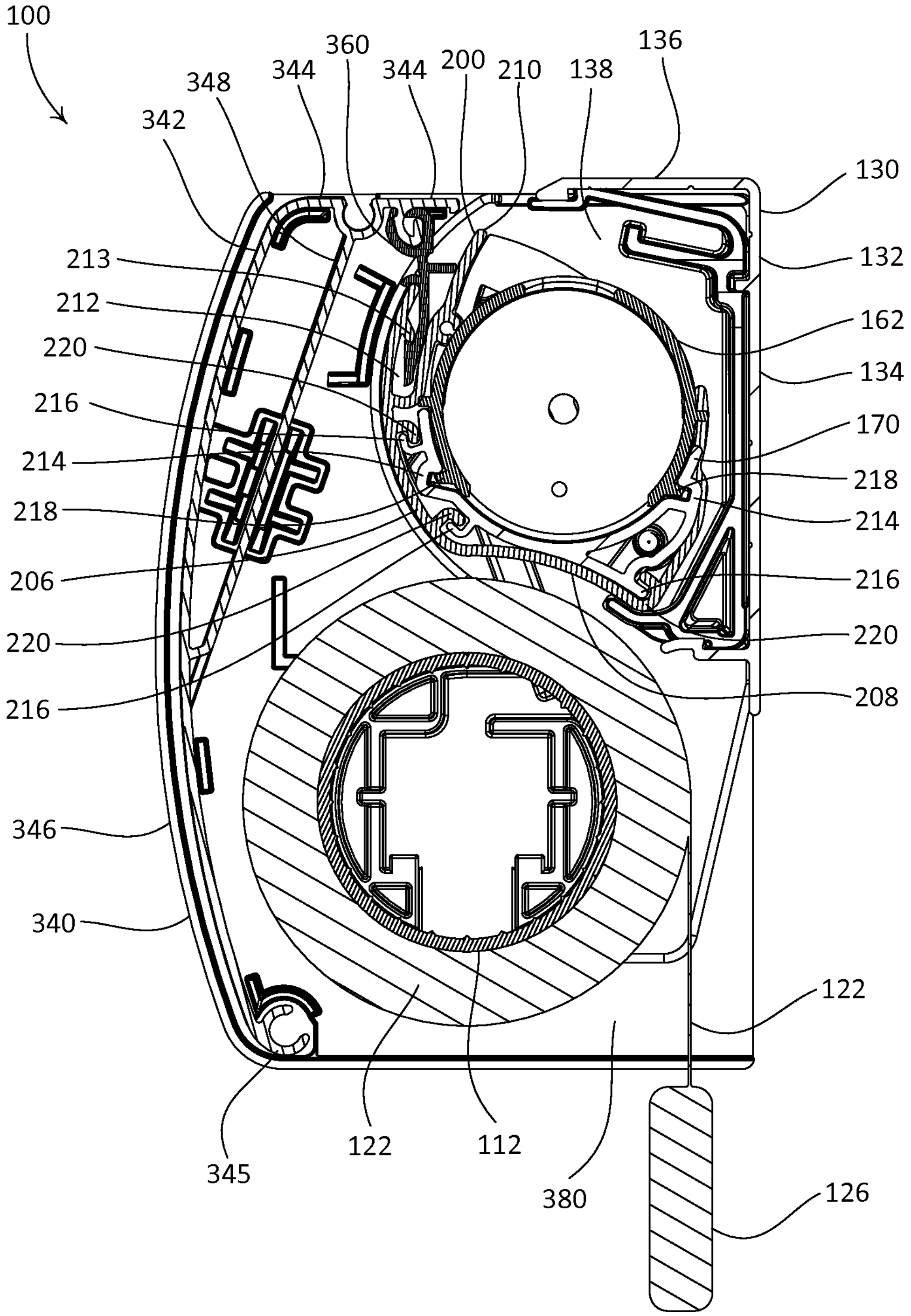
FIG. 6A is a side section view of the example battery-powered roller shade depicted in FIG. 1, with the shade in a raised position, the battery compartment in a closed position, and the fascia raised.
Figure 6B:
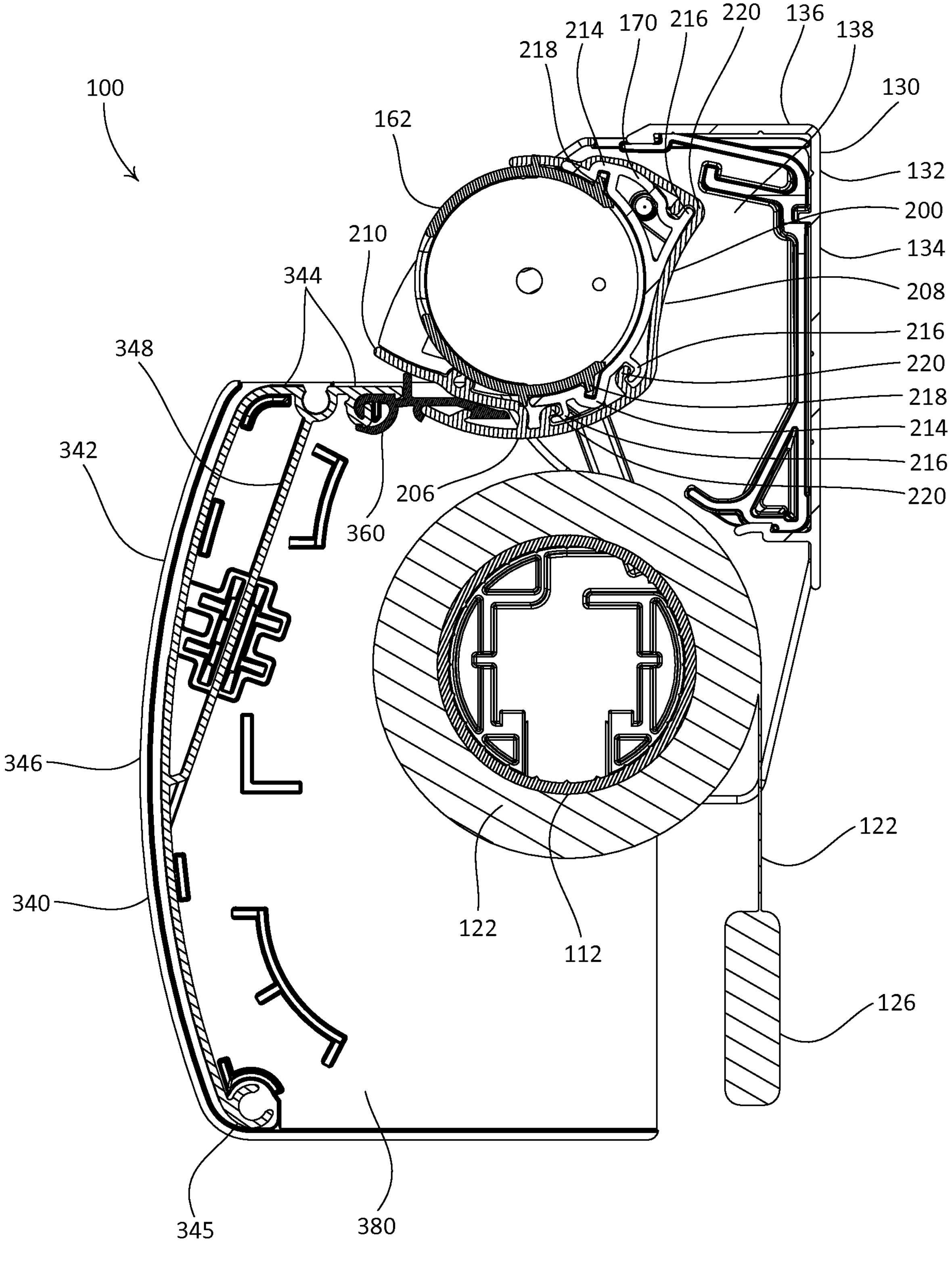
FIG. 6B is a side section view of the example battery-powered roller shade depicted in FIG. 1, with the shade in a raised position, the battery compartment in an opened position, and the fascia lowered.

The rail 132 may define any suitable shape. As shown, the rail 132 includes a rear wall 134 that may be configured to be mounted to a structure, and an upper wall 136 that extends outward from an upper edge of the rear wall 134 along a direction that is substantially perpendicular to the rear wall 134. The rail 132, the first housing bracket 140, and the second housing bracket 150, when in an assembled configuration, may define a cavity 138 (e.g., as shown in FIGS. 6A and 6B). The shade assembly 110 and the battery compartment 160 may be disposed in the cavity 138, for example when the battery-powered roller shade 100 is in an assembled configuration (e.g., as shown in FIGS. 3-5).

The housing 130 may be configured to support one or both of the shade assembly 110 and the battery compartment 160. For example, the first and second housing brackets 140, 150 may be configured to support the shade assembly 110 and/or the battery compartment 160. As shown, the first and second housing brackets 140, 150 are configured to support the shade assembly 110 and the battery compartment 160 such that the battery compartment 160 is located (e.g., is oriented) above the shade assembly 110 when the battery-powered roller shade 100 is mounted to a structure. It should be appreciated that the battery-powered roller shade 100 is not limited to the illustrated orientation of the shade assembly 110 and the battery compartment 160. For example, the housing 130 may be alternatively configured to otherwise support the shade assembly 110 and the battery compartment 160 relative to each other (e.g., such that the battery compartment 160 is otherwise located relative to the shade assembly 110).

As shown, the first housing bracket 140 defines an upper portion 141 and a lower portion 143. The lower portion 143 may be configured to operably support the shade assembly 110, such that the shade fabric 122 may be moved (e.g., between the lowered and raised positions). For example, as shown, the lower portion 143 defines an attachment member 144 that is configured to receive a complementary attachment member of the motor drive unit 118.

The upper portion 141 may be configured to operably support the support the battery compartment 160, such that the battery compartment 160 is operable to provide access to one or more batteries 50 when the battery-powered roller shade 100 is mounted to a structure, in an assembled configuration. For example, as shown, the upper portion 141 defines a post 146 that extends into the cavity 138 when the first housing bracket 140 is attached to first end 131 of the rail 132. The post 146 may be referred to as a first post. The post 146 may be configured to be received by the battery compartment 160, such that the battery compartment 160 is pivotable (e.g., rotatable) about the post 146 between a closed position and an opened position.

As shown, the upper portion 141 further defines a projection 148 that that extends into the cavity 138 when the first housing bracket 140 is attached to the rail 132. The projection 148 may be referred to as a first projection, and may extend further into the cavity 138 than the post 146. Stated differently, the projection 148 may be longer than the post 146. The projection 148 may be configured to be received by the battery compartment 160, such that pivoting of the battery compartment 160 about the post 146 is limited.

As shown, the second housing bracket 150 defines an upper portion 151 and a lower portion 153. The lower portion 153 may be configured to operably support the shade assembly 110, such that the shade fabric 122 may be moved (e.g., between the lowered and raised positions). For example, as shown, the lower portion 153 defines an attachment member 154 that is configured to receive a complementary attachment member of the idler 120.

The upper portion 151 may be configured to operably support the battery compartment 160, such that the battery compartment 160 is operable to provide access to one or more batteries 50 when the battery-powered roller shade 100 is mounted to a structure, and is in an assembled configuration. For example, as shown, the upper portion 151 defines a post 156 that extends into the cavity 138 when the second housing bracket 150 is attached to second end 133 of the rail 132. The post 156 may be referred to as a second post. The post 156 may be configured to be received by the battery compartment 160, such that the battery compartment is pivotable (e.g., rotatable) about the post 156 between the closed position and the opened position.

As shown, the upper portion 151 further defines a projection 158 that extends into the cavity 138 when the second housing bracket 150 is attached to the rail 132. The projection 158 may be referred to as a second projection, and may extend further into the cavity 138 than the post 156. Stated differently, the projection 158 may be longer than the post 156. The projection 158 may be configured to be received by the battery compartment 160, such that pivoting of the battery compartment 160 about the post 156 is limited.

When the first and second housing brackets 140, 150 are attached to the rail 132 (e.g., when the housing 130 is in an assembled configuration), the post 146 and the post 156 may be aligned with each other, and may define a pivot axis P1 (e.g., as depicted in FIG. 1) about which the battery compartment 160 may pivot, for example between the opened and closed positions. The pivot axis P1 may be referred to as a first pivot axis. The housing 130 may support the shade assembly 110 such that the shade assembly 110 remains in a static, supported position when the battery compartment 160 is operated between the opened and closed positions. For example, as shown, the first and second housing brackets 140, 150 support the shade assembly 110 such that when the battery-powered roller shade 100 is in an assembled configuration and is mounted to a structure, the shade assembly 110 does not move relative to the structure when the battery compartment 160 is operated between the opened and closed positions.

The housing 130 may be configured to be mounted to structure using one or more fasteners (e.g., one or more screws). For example, one or more of the rail 132, the first housing bracket 140, or the second housing bracket 150 may define one or more respective apertures that are configured to receive fasteners.

The components of the housing 130 may be made of any suitable material or combination of materials. For example, the rail 132 may be made of metal and the first and second housing brackets 140, 150 may be made of plastic. Although the illustrated housing 130 includes separate components, it should be appreciated that the housing 130 may be otherwise constructed. For example, the rail 132, the first housing bracket 140, and the second housing bracket 150 may be monolithic. In another example, the rail may include first and second rail sections that may be configured to attach to one another. In such an example configuration, the first rail section may include an integrated first housing bracket and the second rail section may include an integrated second housing bracket. One or more components of the housing 130 (e.g., one or more of the rail 132, the first housing brackets 140, or the second housing bracket 150) may be wrapped in a material (e.g., fabric), for instance to enhance the aesthetics of the housing 130.

The battery compartment 160 may be configured to hold (e.g., to retain) one or more batteries 50. The battery compartment 160, when supported by the housing 130, may be operated between an opened position and a closed position, for example by causing the battery compartment 160 to pivot about the pivot axis P1. When the battery compartment 160 is in the closed position, the one or more batteries 50 held by the battery compartment 160 are concealed from view (e.g., as shown in FIG. 4). When the battery compartment 160 is in the opened position, the one or more batteries 50 held by the battery compartment 160 may be at least partially visible (e.g., as shown in FIG. 5), and are accessible, such that one or more batteries 50 may be removed from, or disposed into, the battery compartment 160. For example, when the battery compartment 160 is in the opened position, one or more batteries 50 may be removed from, or disposed into, the battery compartment 160 along a direction that is perpendicular to the longitudinal axis of the roller tube 112. In this regard, one or more batteries 50 held by the battery compartment 160 are accessible along a direction that is perpendicular to the longitudinal axis when the battery compartment 160 is in the opened position. In an example of mounting the battery-powered roller shade 100 to a structure, the battery-powered roller shade 100 may be mounted internally with respect to the frame of a window (e.g., inside the window frame of the window), for example in accordance with an internal mount configuration. When the battery-powered roller shade 100 is mounted inside of a window frame, the batteries 50 may be accessible within an area defined by a periphery of the window frame. The battery compartment 160 may be operated between the opened and closed positions when the battery-powered roller shade 100 is in an assembled configuration and is mounted to a structure.

In accordance with the illustrated battery-powered roller shade 100, the battery compartment 160 may be operated between closed and opened positions, regardless of what position the shade fabric 122 is in relative to the roller tube 112. For example, the battery compartment 160 may be operated between the opened and closed position when the shade fabric 122 is in a lowered position, is in a raised position, or is in any intermediate position between the raised and lowered positions. Stated differently, the battery compartment 160 may be operated between the opened and closed positions independently of an amount of the shade fabric 122 that is lowered. Stated differently still, the battery compartment 160 may be operated between the opened and closed positions without adjusting the roller tube 112 (e.g., without causing the roller tube 112 to rotate). Because the shade fabric 122 may remain in a static position while the battery compartment 160 is operated between the closed and opened positions, the motor drive unit 118 may properly maintain tracking information of the position of the shade fabric 122 while one or more batteries 50 are removed from the battery compartment 160 (e.g., while one or more batteries 50 are replaced).

When the illustrated battery compartment 160 is operated from the closed position (e.g., as shown in FIG. 6A) to the opened position (e.g., as shown in FIG. 6B), the battery compartment 160 pivots about the pivot axis P1, such that the battery compartment 160, and thus one or more batteries 50 retained by the battery compartment 160, moves away from (e.g., rotates away from) a plane defined by the shade fabric 122 (e.g., a plane defined by a portion of the shade fabric 122 that is unwound from the roller tube 112 and is hanging vertically). In this regard, when the battery compartment 160 is operated from the closed position to the opened position, the battery compartment 160 may move away from (e.g., rotate away from) a structure that the battery-powered roller shade 100 is mounted to (e.g., a window frame).

The illustrated battery compartment 160 is elongate between a first end 161 and an opposed second end 163. The battery compartment 160 may be configured to hold one or more batteries 50, for example in a linear (e.g., coaxial) arrangement between the first and second ends 161, 163. The battery compartment 160 may be in electrical communication with (e.g., electrically coupled to) one or more electrical components of the battery-powered roller shade 100, for instance the motor drive unit 118, such that DC power from the one or more batteries 50 is delivered to the electrical components. For example, the battery compartment 160 may include respective electrical contacts disposed at the first and second ends 161, 163. The electrical contacts may be configured to abut corresponding terminals of a first battery 50 disposed at the first end 161, and of a last battery 50 disposed at the second end 163, so as to place the batteries 50 in electrical communication with one or more electrical components of the battery-powered roller shade 100.

The electrical contacts may be placed in electrical communication with one or components of the battery-powered roller shade 100. For example, corresponding wires may connect the electrical contacts to the motor drive unit 118. The wires may be integrated with (e.g., pass through, be enclosed within, and/or be mounted to) one or more of the shade assembly 110, the housing 130, the battery compartment 160, or respective components thereof. For example, wires may be run from the electrical contacts, through the battery compartment 160 along the pivot axis P1 (e.g., through one or both of the posts 146, 156), along a surface of the housing 130, into the shade assembly 110, and to the motor drive unit 118.

As shown, the battery compartment 160 includes a battery holder 162, a support 170, and a cover 200. The battery holder 162 may be configured to hold (e.g., to retain) one or more batteries 50 within the battery compartment 160. The battery holder 162, the support 170, and the cover 200 may be configured to be attached to one another, for example when the battery compartment 160 is in an assembled configuration. The antenna of the battery-powered roller shade 100 may be arranged on the cover 200 and may be in electrical communication with a wireless communication circuit in the motor drive unit 118. For example, the antenna may comprise a monopole antenna (e.g., a wire). For example, the antenna may extend along a surface of the cover 200, along the pivot axis P1 (e.g., through one or both of the posts 146, 156), into the shade assembly 110, and to the motor drive unit 118.

The illustrated battery holder 162 is elongate between a first end 164 and an opposed second end 165. The battery holder 162 may define any suitable shape, such as the illustrated cylindrical shape. The battery holder 162 may define a cavity that is sized to receive one or more batteries 50. For example, as shown, the battery holder 162 defines a cylindrical channel 166 that is configured to receive one or more batteries 50 in a linear (e.g., coaxial) arrangement between the first and second ends 164, 165. The channel 166 may define a diameter that is slightly larger than an outer diameter of a battery 50, such that a battery 50 may move (e.g., slide) when disposed in the battery holder 162. The diameter of the channel 166 may be, for example, in the range of about 1.25 inches to about 1.38 inches, such as about 1.3 inches. The battery holder 162 may be made of any suitable material, such as plastic.

As shown, the battery holder 162, and thus the battery compartment 160, is configured to retain six (6) D cell (e.g., IEC R20) batteries in a head to tail, linear (e.g., coaxial) arrangement in the channel 166. The battery holder 162 may have a length (e.g., as defined by the first and second ends 164, 165) such that the batteries 50 are held in respective positions in the channel 166 when the battery holder 162 is filled with six batteries 50. The battery holder 162 may include respective electrical contacts disposed at the first and second ends 164, 165. One or more of the electrical contacts may be configured to press the corresponding terminals of the batteries 50 against one another, for example to maintain electrical communication among the batteries 50. It should be appreciated that the battery holder 162, and thus the battery compartment 160, is not limited to the illustrated number and size of batteries 50 or to the illustrated linear arrangement of batteries 50, and that the battery compartment 160 may be alternatively configured to hold more or fewer batteries of any size, in any suitable arrangement.

The battery holder 162 may define an opening through which a battery 50 may be removed from, or inserted into, the battery holder 162. For example, as shown, the battery holder 162 defines an access aperture 167 through which a battery 50 may be removed from, or inserted into, the channel 166. Stated differently, the battery compartment 160 defines an access aperture 167 through which a battery 50 may be removed from, or inserted into, the battery compartment 160. When the battery compartment 160 is in the closed position, the access aperture 167 may be disposed in the cavity 138 and hidden from view (e.g., as shown in FIG. 6A). When the battery compartment 160 is in the opened position, the access aperture 167 may be external to the cavity 138 and accessible (e.g., as shown in FIG. 6B), such that one or more batteries 50 may be disposed into, or removed from, the battery compartment 160.

The access aperture 167 may be sized such that a battery 50 may be freely inserted through the access aperture 167 and into the battery holder 162 (e.g., with little or no resistance). As shown, the access aperture 167 defines a length, along an axial direction between the first and second ends 164, 165, that is slightly longer than a length of a battery 50 (e.g., as defined between the contacts of the battery 50), and defines a width that is slightly wider than an outer diameter of the battery 50. The illustrated access aperture 167 is located near the second end 165 of the battery holder 162, and near the second end 163 of the battery compartment 160. It should be appreciated, however, that the access aperture 167 may be located elsewhere along the battery holder 162.

When a battery 50 is disposed into the channel 166 of the battery holder 162, the battery 50 may be moved (e.g., slid) between the first and second ends 164, 165 of the battery holder 162. In this regard, the battery holder 162 may be configured for slidable movement of a battery 50 between the first and second ends 164, 165. And more generally, the battery compartment 160 may be configured for slidable movement of a battery 50 between the first and second ends 161, 163.

The battery holder 162 may be configured to allow movement of one or more batteries 50 between the first and second ends 164, 165 of the battery holder 162 while the battery-powered roller shade 100 is in an assembled configuration. As shown, for example, the battery holder 162 defines a slot 168 that is open to the access aperture 167, and that extends along the battery holder 162 toward the first end 164, in the axial direction. Stated differently, the battery compartment 160 defines a slot 168 that is open to the access aperture 167, and that extends along the battery compartment 160 toward the first end 161, in the axial direction. It should be appreciated that the battery holder 162 is not limited to the illustrated configuration of the slot 168.

The slot 168 may define a width (e.g., between opposed edges of the slot 168 along a direction that is perpendicular to the axial direction) that is narrower than the outer diameter of a battery 50, but wide enough to allow an operator of the battery-powered roller shade 100 to slide a battery along the channel 166 between the first and second ends 164, 165 (e.g., using a finger disposed in the slot 168). The width of the slot 168 may be, for example, in the range of about 0.5 inches to about 1.0 inches, such as about 0.75 inches.

The battery holder 162 may be configured to retain a battery 50 that is disposed in the channel 166 and located at the access aperture 167. For example, as shown, the battery holder 162 defines opposed, resilient retention tabs 169 that extend above the access aperture 167. The retention tabs 169 may follow the curvature of the battery holder 162. The retention tabs 169 may be configured to deflect out of the way when a battery 50 is inserted into the battery holder 162, and to resiliently return to respective substantially undeflected positions when the battery 50 is seated in the channel 166, such that the battery 50 is retained in the battery holder 162.

The illustrated support 170 includes a rail 172 that is elongate between a first end 171 and an opposed second end 173, a first support bracket 180, and a second support bracket 190. The rail 172, the first support bracket 180, and the second support bracket 190 may be configured to attach to one another in an assembled configuration. For example, the first support bracket 180 may be configured to be attached to the first end 171 of the rail 172, and the second support bracket 190 may be configured to be attached to the second end 173 of the rail 172. As shown, the first support bracket 180 defines an attachment member 182 that is configured to engage the first end 171 of the rail 172, and the second support bracket 190 defines an attachment member 192 that is configured to engage the second end 173 of the rail 172. It should be appreciated that the rail 172, the first support bracket 180, and the second support bracket 190 are not limited to the illustrated attachment members.

The first support bracket 180 may define a first end 174 of the support 170, and the second support bracket 190 may define a second end 175 of the support 170. The first end 174 of the support 170 may coincide with the first end 161 of the battery compartment 160, and the second end 175 of the support 170 may coincide with the second end 163 of the battery compartment 160. As shown, the support 170 is elongate between the first end 174 and the second end 175.

The first and second ends 174, 175 of the support 170 may be configured to be attached to, and supported by, the housing 130, such that the support 170, and thus the battery compartment 160, is pivotable about the pivot axis P1. For example, as shown, the first support bracket 180 defines an aperture 184 that is configured to receive the post 146 of the first housing bracket 140 of the housing 130. The aperture 184 may be referred to as a first aperture. The second support bracket 190 defines an aperture 194 that is configured to receive the post 156 of the second housing bracket 150 of the housing 130. The aperture 194 may be referred to as a second aperture. When the first and second support brackets 180, 190 are attached to the rail 172 (e.g., when the support 170 is in an assembled configuration), the apertures 184, 194 may be aligned with one another, such that the pivot axis P1 extends through respective centers of the apertures 184, 194. When the first post 146 is disposed in the first aperture 184 and the second post 156 is disposed in the second aperture 194, the battery compartment 160 may be pivoted about the pivot axis P1.

The support 170 may be configured to limit a distance that the battery compartment 160 pivots about the posts 146 and 156. For example, as shown, the first support bracket 180 may define an arc shaped slot 186 that is spaced from the aperture 184, and that is configured to receive the projection 148 of the first housing bracket 140 of the housing 130. The slot 186 may be referred to as a first slot. As shown, the slot 186 has a first end 187 and a second end 189. The second support bracket 190 may define an arc shaped slot 196 that is spaced from the aperture 194, and that is configured to receive the projection 158 of the second housing bracket 150 of the housing 130. The slot 196 may be referred to as a second slot. As shown, the slot 196 has a first end 197 and a second end 199. The slots 186, 196 may be aligned with each other when the support 170 is in an assembled configuration.

The first ends 187, 197 of the slots 186, 196 may define a first pivot stop that corresponds to the closed position of the battery compartment 160, such that the projection 148 abuts the first end 187 and the projection 158 abuts the first end 197 when the battery compartment 160 is in the closed position. The second ends 189, 199 of the slot 186, 196 may define a second pivot stop that corresponds to the opened position of the battery compartment 160, such that the projection 148 abuts the second end 189 and the projection 158 abuts the second end 199 when the battery compartment 160 is in the opened position. In this regard, the battery compartment 160 may define a first pivot stop related to the closed position of the battery compartment 160, and may define a second pivot stop related to the opened position of the battery compartment 160.

As shown, the battery compartment 160 is configured to be mechanically bistable with respect to the first and second pivot stops. For example, when the battery compartment 160 is in the closed position, the projections 148 and 158 may abut the first ends 187 and 197, respectively, such that the battery compartment 160 is stable (e.g., at rest with respect to the housing 130). When the battery compartment 160 is in the opened position, the projections 148 and 158 may abut the second ends 189 and 199, respectively, such that the battery compartment 160 is stable (e.g., at rest with respect to the housing 130). Stated differently, the battery compartment 160 is stable in the closed and opened positions, and thus mechanically bistable with respect to the closed and opened positions.

The components of the support 170 may be made of any suitable material or combination of materials. For example, the rail 172 may be made of metal and the first and second support brackets 180, 190 may be made of plastic. Although the illustrated support 170 includes separate components, it should be appreciated that the support 170 may be otherwise constructed. For example, the rail 172, the first support bracket 180, and the second support bracket 190 may be monolithic.

The illustrated cover 200 is elongate between a first end 202 and an opposed second end 204. The first end 202 may coincide with the first end 161 of the battery compartment 160, and second end 204 may coincide with the second end 163 of the battery compartment 160. As shown, the cover 200 includes a curved front wall 206, and a curved lower wall 208. The cover 200 may be configured to at least partially enclose the battery holder 162. For example, as shown, the front wall 206 and the lower wall 208 at partially enclose the battery holder 162. The illustrated front wall 206 defines an upper edge 210, and defines a groove 212 that extends away from the upper edge 210. As shown, the front wall 206 may define a projection 213 that extends into the groove 212.

When the battery compartment 160 is supported by the housing 130 and is in the closed position, the front wall 206 may exhibit convex curvature relative to the rear wall 134 of the housing 130, and the lower wall 208 may exhibit concave curvature relative to the upper wall 136 of the housing 130. The curvature of the lower wall 208 may be configured to follow that of the shade fabric 122 when the shade fabric 122 is in the raised position, such that the lower wall 208 does not interfere with operation of the shade assembly 110 (e.g., does not make contact with the roller tube 112 or material of the shade fabric 122 that is wound onto the roller tube 112).

The cover 200 may be configured to conceal the battery holder 162 and the support 170, and to at least partially conceal the cavity 138. For example, when the battery compartment 160 is in the closed position, the front wall 206 may conceal the battery holder 162, one or more batteries 50 disposed in the battery holder 162, and one or more portions of the cavity 138 and/or the housing 130 that may otherwise be visible if the cover 200 was absent. When the battery compartment 160 is in the closed position and the shade fabric 122 is lowered (e.g., to the lowered position), the lower wall 208 may conceal the battery holder 162 and one or more portions of the cavity 138 and/or the housing 130 that may otherwise be visible if the cover 200 was absent. The cover 200 may be made of any suitable material, such as plastic. The cover 200 may be wrapped in a material (e.g., fabric), for instance to enhance the aesthetics of the cover 200.

The battery holder 162, the support 170, and the cover 200, may be configured to be attached to one another, for example when the battery compartment 160 is in an assembled configuration. In an assembled configuration of the battery compartment 160, the battery holder 162 may be attached to the support 170, and the cover 200 may be attached to the support 170. In this regard, it may be said that the support 170 attaches the cover 200 to the battery holder 162 (e.g., indirectly).

In accordance with the illustrated battery compartment 160, the battery holder 162, the support 170, and the cover 200 may define respective complementary attachment members (e.g., as shown in FIGS. 6A and 6B). For example, the support 170 may define first attachment members 214 that are configured to engage complementary attachment members of the battery holder 162, and second attachment members 216 that are configured to engage with complementary attachment members of the cover 200. The battery holder 162 may define attachment members 218 that are configured to engage with the first attachment members 214 of the support 170. The cover 200 may define attachment members 220 that are configured to engage with the second attachment members 216 of the support 170.

As shown, the attachment members 218 of the battery holder 162 are configured as projections, and the first attachment members 214 of the support 170 are configured as receptacles that are configured to receive and engage the projections. As shown, the attachment members 220 of the cover 200 and the second attachment members 216 of the support 170 are respectively configured as complementary hooks that are configured to engage one another. It should be appreciated that the components of the battery compartment 160 are not limited to the illustrated attachment members, and that one or more of the battery holder 162, the support 170, or the cover 200 may be alternatively configured with any suitable number and configuration of attachment members to facilitate attachment of the components to one another.

In an example of operating the battery compartment 160 of the battery-powered roller shade 100 from the closed position to the opened position, a force may be applied to the battery compartment 160 (e.g., to the upper edge 210 of the front wall 206 of the cover 200) to cause the battery compartment 160 to pivot about the posts 146, 156 of the housing 130. As the battery compartment 160 pivots out of the cavity 138 about the pivot axis P1, the projections 148, 158 of the housing 130 move in the slots 186, 196 of the support 170 (e.g., from the first ends 187, 197 toward the second ends 189, 199, respectively), and the battery holder 162 gradually becomes exposed. As the battery compartment 160 pivots into the opened position, the projections 148, 158 may abut the second ends 189, 199 of the slots 186, 196. With the battery compartment 160 in the opened position (e.g., as shown in FIG. 6B), the access aperture 167 and the slot 168 are exposed, such that one or more batteries 50 may be inserted into, or removed from, the channel 166 (e.g., via the access aperture 167).

With the battery compartment 160 in the opened position, one or more batteries 50 may be replaced (e.g., if the batteries 50 are drained). A first battery 50 that is disposed at the access aperture 167 may be removed from the channel 166 by lifting the first battery 50 out of the channel 166 past the retention tabs 169. At the access aperture 167, one battery 50 at a time may be removed from the battery compartment 160, and thus from the housing 130 of the battery-powered roller shade 100, without interfering with the housing 130, the roller tube 112, or the shade fabric 122. With the first battery 50 removed, a second battery 50 may be removed from the channel 166 by sliding the second battery 50 along the channel 166 toward the access aperture 167 (e.g., by using a finger disposed in the slot 168). When the second battery 50 reaches the access aperture 167, it may be removed from the channel 166 similarly to the first battery 50. This process may be repeated for one or more additional batteries 50 (e.g., all six batteries 50). When a desired number of batteries 50 have been removed from the channel 166, one or more fresh batteries 50 (e.g., replacement batteries) may be disposed into the channel 166 past the retention tabs 169 and slid into position in the battery holder 162 (e.g., using the slot 168). When the battery holder 162 is filled with batteries 50, the battery compartment 160 may be operated from the opened position to the closed position.

In an example of operating the battery compartment 160 of the battery-powered roller shade 100 from the opened position to the closed position, a force may be applied to the battery compartment 160 (e.g., to the cover 200) to cause the battery compartment 160 to pivot about the posts 146, 156 of the housing 130. As the battery compartment 160 pivots into the cavity 138 about the pivot axis P1, the projections 148, 158 of the housing 130 move in the slots 186, 196 of the support 170 (e.g., from the second ends 189, 199 toward the first ends 187, 197, respectively), and the battery holder 162 is gradually concealed in the housing 130. As the battery compartment 160 pivots into the closed position (e.g., as shown in FIG. 6A), the projections 148, 158 may abut the first ends 187, 197 of the slots 186, 196.

The battery compartment 160 may be easily operated between the closed and opened positions. For example, an individual may operate the battery compartment 160 between the opened and closed positions using a single hand. Additionally, one or more batteries 50 may be removed from, or inserted into, the battery compartment 160 using a single hand. Such one-handed operation of the battery compartment 160 may enable the individual to freely use their other hand while replacing one or more batteries 50, for instance to brace himself or herself on a ladder.

The fascia 330 may be configured to conceal one or more components of the battery-powered roller shade 100, for instance when the battery compartment 160 is in the closed position. For example, the fascia 330 may be configured to be at rest in a raised (e.g., closed) position when the battery compartment 160 is in the closed position (e.g., as shown in FIG. 6A). The raised position of the fascia 330 may be referred to as a conceal position of the fascia 330. When the fascia 330 is in the conceal position, the fascia 330 may conceal the roller tube 112, a portion of the shade fabric 122 that is wound onto the roller tube 112, the battery compartment 160, and one or more portions of the housing 130 when the battery compartment 160 is in the closed position. In this regard, the fascia 330 may be configured to at least partially conceal the cavity 138 when the battery compartment 160 is in the closed position.

The fascia 330 may be configured to move when with the battery compartment 160 is moved between the opened and closed positions, for instance such that the fascia 330 does not interfere with inserting batteries 50 into, or removing batteries 50 from, the battery compartment 160 when the battery compartment 160 is in the opened position. For example, the fascia 330 may be configured to move downward and away from the housing 130 as the battery compartment 160 is pivoted from the closed position to the opened position, such that the fascia 330 is at rest in a lowered (e.g., open) position when the battery compartment 160 is in the opened position (e.g., as shown in FIG. 6B). The lowered position of the fascia 330 may be referred to as an expose position of the fascia 330. As shown, when the fascia 330 is in the expose position, the fascia 330 may be positioned such that the fascia 330 does not interfere with access to the battery compartment 160. In this regard, it may be said that the fascia 330 does not cover the battery compartment 160 when the fascia 330 is in the expose position. As shown, when the fascia 330 is in the expose position, the fascia 330 may still conceal the roller tube 112, a portion of the shade fabric 122 (e.g., a portion of the shade fabric 122 that is wound onto the roller tube 112), and one or more portions of the housing 130.

The fascia 330 may be operably attached to the battery compartment 160, such that the fascia 330 moves along with the battery compartment 160 when the battery compartment 160 is moved between the opened and closed positions. For example, as shown, the fascia 330 may be pivotally supported by the battery compartment 160, such that the fascia 330 pivots from the conceal position to the expose position as the battery compartment 160 is operated from the closed position to the opened position, and pivots from the exposed position to the conceal position as the battery compartment 160 is operated from the opened position to the closed position.

The illustrated fascia 330 is a two part fascia that includes a cover portion that may be referred to as a cover 340, and a support portion that may be referred to as an arm 360. The cover 340 and the arm 360 may be configured to be operably coupled to one another such that the cover 340 and the arm 360 are capable of moving (e.g., rotating or pivoting) relative to one another. As shown, the cover 340 may be supported by the arm 360 such that the cover 340 is rotatable about a portion of the arm 360. The arm 360 may be configured to attach to the battery compartment 160 such that the arm 360 remains in a fixed orientation relative to the battery compartment 160 as the battery compartment 160 is operated between the closed and opened positions. In this regard, the fascia 330 may be supported by the battery compartment 160, for instance via the arm 360.

As shown, the cover 340 of the fascia 330 may be configured as a cover assembly that includes a cover body 342 that is elongate between a first end 341 and an opposed second end 343, a first end cap 380, and a second end cap 390. The illustrated cover body 342 includes an upper wall 344, a curved front wall 346 that extends from the upper wall 344 to a lower end 345, and a support wall 348 that extends from the upper wall 344 to the front wall 346.

As shown, the front wall 346 has a height (e.g., as defined from the upper wall 344 to the lower end 345) such that the lower end 345 extends below the roller tube 112 and the portion of the shade fabric 122 that is wound onto the roller tube 112 when the shade fabric 122 is in the raised position (e.g., as shown in FIG. 6A). As shown, the first and second end caps 380, 390 may conform to the curvature of the front wall 346, and may be configured to cover the first and second housing brackets 140, 150, respectively, of the housing 130 when the battery compartment 160 is in the closed position. It should be appreciated that the fascia 330 is not limited to the illustrated curvature and/or height of the front wall 346, or to the respective configurations of the first and second end caps 380, 390.

The cover body 342, the first end cap 380, and the second end cap 390 may be configured to attach to one another in an assembled configuration. For example, the first end cap 380 may be configured to be attached to the first end 341 of the cover body 342, and the second end cap 390 may be configured to be attached to the second end 343 of the cover body 342. As shown, the first end cap 380 defines an attachment member 382 that is configured to engage the first end 341 of the cover body 342, and the second end cap 390 defines an attachment member 392 that is configured to engage the second end 343 of the cover body 342. It should be appreciated that the cover body 342, the first end cap 380, and the second end cap 390 are not limited to the illustrated attachment members. It should further be appreciated that the cover 340 is not limited to the illustrated components. For example, the cover body 342, the first end cap 380, and the second end cap 390 may be monolithic.

The illustrated arm 360 is elongate between a first end 361 and an opposed second end 363. As shown, the arm 360 has a length (e.g., as defined from the first end 361 to the second end 363) that is substantially the same as a corresponding length of the cover body 342 (e.g., as defined from the first end 341 to the second end 343).

The illustrated arm 360 comprises a body that extends from the first end 361 to the second end 363, and from an upper end 362 to a lower end 364. The arm 360 may be configured to attach to the battery compartment 160. For example, as shown, the arm 360 defines an attachment member 366 at the lower end 364 of the body. The attachment member 366 is configured to be disposed into, and engage within, the groove 212 of the cover 200 of the battery compartment 160, thereby attaching the arm 360 to the battery compartment 160. As shown, the attachment member 366 has a wedge shape that defines a retaining edge 367 that is configured to abut the projection 213 in the groove 212. The attachment member 366 may be retained in position in the groove 212 by engagement between the retaining edge 367 and the projection 213.

The arm 360 may be configured such that when the arm 360 is attached to the battery compartment 160, the arm 360 remains in a fixed orientation relative to the battery compartment 160, for instance as the battery compartment 160 is operated between the closed and opened positions. For example, the arm 360 may define one or more contact members 368 that extend from the body. As shown, the arm 360 defines two contact members 368 that are configured to maintain contact with the cover 200 when the arm 360 is attached to the battery compartment 160. Contact between one or more of the contact members 368 and the cover 200, between the attachment member 366 and the projection 213, and/or between one or more locations on the body of the arm 360 and corresponding locations on the cover 200 may operate to maintain the arm 360 in the illustrated fixed orientation relative to the battery compartment 160. It should be appreciated that the arm 360 is not limited to the illustrated configuration and/or arrangement of contact members 368. It should further be appreciated that fascia 330 is not limited to the illustrated configuration of an arm 360 that is configured to be attached to the cover 200. For example, the fascia could alternatively include an arm that is integral (e.g., monolithic) with respect to a component of the battery compartment, such as the cover of the battery compartment.

In accordance with the illustrated fascia 330, the cover 340 and the arm 360 may be configured to be operably coupled to one another such that the cover 340 is pivotable about at least a portion of the arm 360. For example, the cover 340 and the arm 360 may define complementary connectors that are configured to interlock with each other, such that corresponding portions of the cover 340 and the arm 360 are rotatable relative to each other.

As shown, the arm 360 defines a connector at the upper end 362 in the form of a channel 370. The channel 370 may be referred to as a first connector of the fascia 330. The illustrated channel 370 extends along the length of the arm 360, for example from the first end 361 to the second 363. The channel 370 of the illustrated arm 360 is defined by a straight portion 372 of the arm 360 that is located near the upper end 362, a ledge 373 that extends from the upper end 362 along a direction that is perpendicular to the straight portion 372, and a curved member 374 that extends outward along an arc from a location on the arm 360 that is near a lower end of the straight portion 372, and that is spaced inward from the upper end 362. The curved member 374 may define a free end 375 that is located near the ledge 373. The free end 375 of the curved member 374 and the ledge 373 define an opening into the channel 370. It should be appreciated that while the illustrated channel 370 extends along the length of the arm 360, that the arm 360 is not limited to this configuration. For example, the arm could be alternatively configured with two or more sections of channel spaced apart from each other along the length of the arm.

The cover 340 defines a complementary connector in the form of a projection 350 that extends inward from an inner surface of the upper wall 344 of the cover 340, and that is configured to be operably coupled to the channel 370. The projection 350 may be referred to as a second connector of the fascia 330. The illustrated projection 350 extends along the length of the cover 340, for example from the first end 341 to the second end 343.

The projection 350 may be configured to interlock within the channel 370 of the arm 360. For example, the illustrated projection 350 includes a curved portion 351 that extends downward along an arc from the upper wall 344, and a straight portion 352 that extends from an end of the curved portion 351 toward the upper wall 344 along a direction that is substantially perpendicular to the upper wall 344, such that the projection defines a hook shaped cross section that is configured to be disposed into the opening of the channel 370 and to captively interlock within the channel 370. The projection 350 may alternatively be referred to as a hook. It should be appreciated that while the illustrated projection 350 extends along the length of the cover 340, that the cover 340 is not limited to this configuration. For example, the arm could be alternatively configured with two or more sections of projection spaced apart from each other along the length of the cover.

The channel 370 and the projection 350 may be configured such that the cover 340 and the arm 360 are rotatable (e.g., pivotable) relative to each other when the projection 350 is disposed into (e.g., interlocked within) the channel 370. As shown, the channel 370 and the projection 350 are configured such that, when the projection 350 is interlocked within the channel 370, the cover 340 is pivotable relative to the arm 360, for instance when the battery compartment 160 is operated between the opened and closed positions. In this regard, it may be said that the second connector (e.g., the projection 350) is configured to pivotally interlock with the first connector (e.g., the channel 370).

When the projection 350 is pivotally interlocked in the channel 370, the projection 350 and the channel 370 may define a pivot axis P2 (e.g., as depicted in FIG. 5) about which the cover 340 may pivot relative to the arm 360. Stated differently, the first and second connectors of the fascia 330 may define a pivot axis P2 about which the cover 340 pivots relative to the arm 360. The pivot axis P2 may be referred to as a second pivot axis.

The channel 370 and the projection 350 may be configured to exhibit smooth, consistent movement when pivoting relative to each other, such as when the fascia 330 is pivoted between the conceal and expose positions. For example, the channel 370 and the projection 350 may define one or more complementary sliding interfaces, along which the projection 350 and the channel 370 may slide relative to each other as the projection 350 pivots within the channel 370. As shown, the curved portion 351 of the projection 350 defines a first curved surface 354 that may be referred to as an inner sliding surface of the projection 350, and the ledge 373 defines a complementary curved surface 376 that may be referred to as an outer sliding surface of the channel 370. The curved surface 354 and the curved surface 376 may define a first sliding interface between the channel 370 and the projection 350. The curved portion 351 of the projection 350 further defines a second curved surface 356 that may be referred to as an outer sliding surface of the projection 350, and the curved member 374 of the channel 370 defines a complementary curved surface 378 that may be referred to as an inner sliding surface of the channel 370. The curved surface 356 and the curved surface 378 may define a second sliding interface between the channel 370 and the projection 350.

Figure 7A:
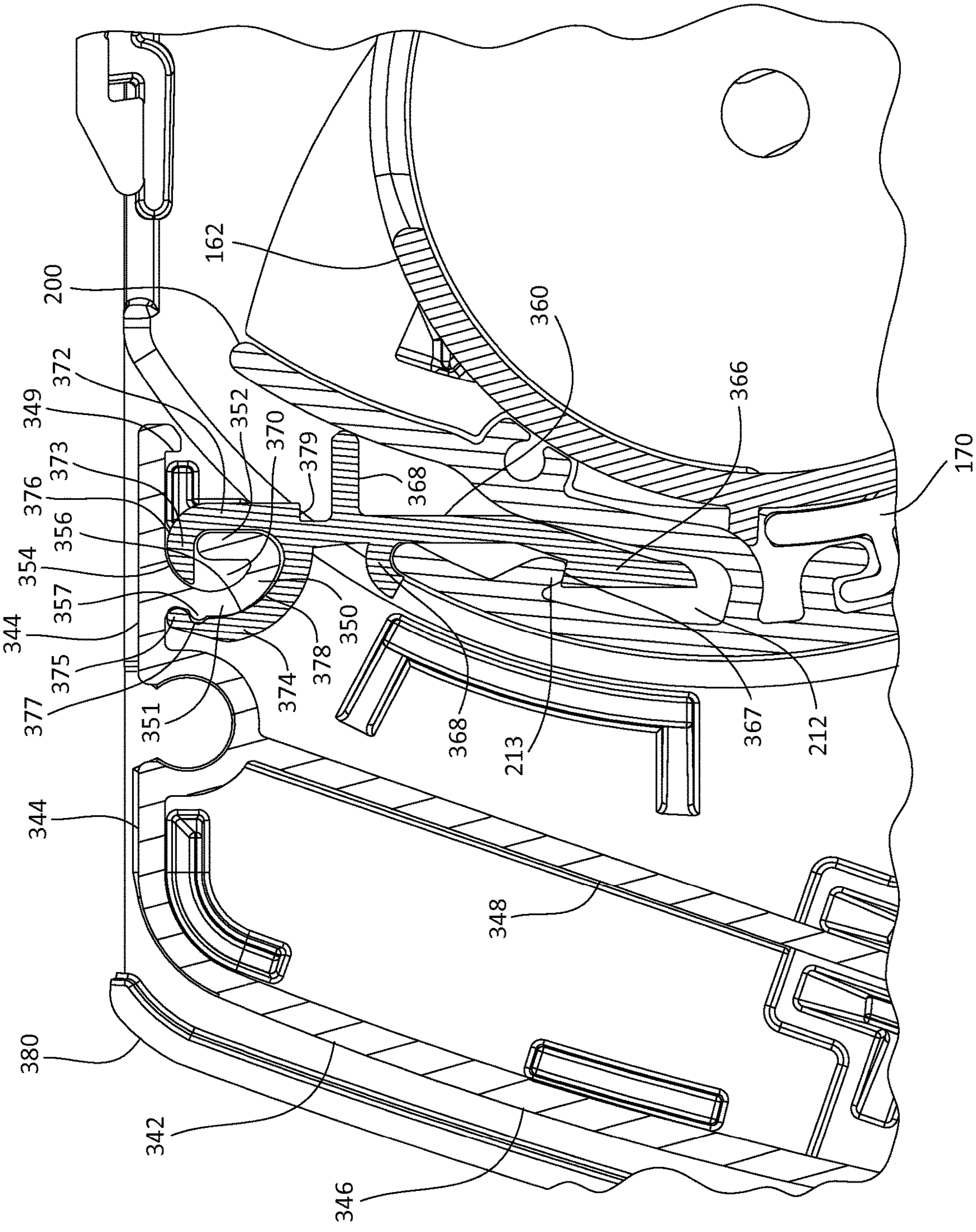
FIG. 7A is a zoomed side section view of a portion of the example battery-powered roller shade depicted in FIG. 1, with the battery compartment in a closed position and the fascia raised.

When the fascia 330 is at rest in the conceal position (e.g., when the battery compartment 160 is in the closed position), the straight portion 352 of the projection 350 may abut the straight portion 372 of the channel 370 (e.g., as shown in FIG. 7A). Additionally, the free end 375 of the curved member may abut a corresponding portion of the upper wall 344 of the cover 340. Abutment of the straight portion 352 of the projection 350 with the straight portion 372 of the channel 370, and/or abutment of the free end 375 of the curved member 374 with the upper wall 344 of the cover 340, may cause the upper wall 344 of the cover 340 to be oriented substantially parallel to the upper wall 136 of the housing 130 when the battery compartment 160 is in the closed position (e.g., as shown in FIG. 6A).

Figure 7B:
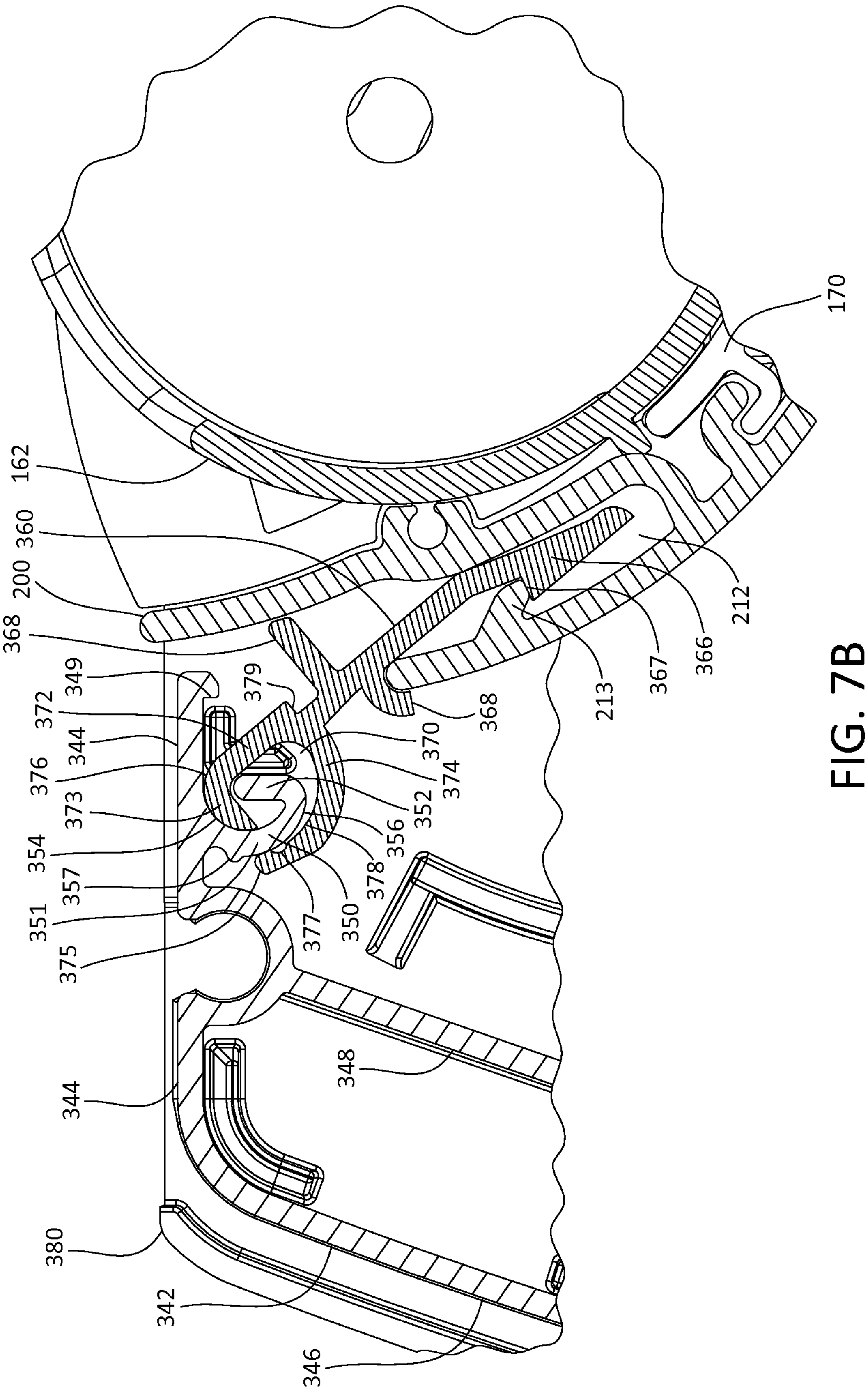
FIG. 7B is a zoomed side section view of a portion of the example battery-powered roller shade depicted in FIG. 1, with the battery compartment and the fascia pivoted to respective intermediate positions.
Figure 7C:
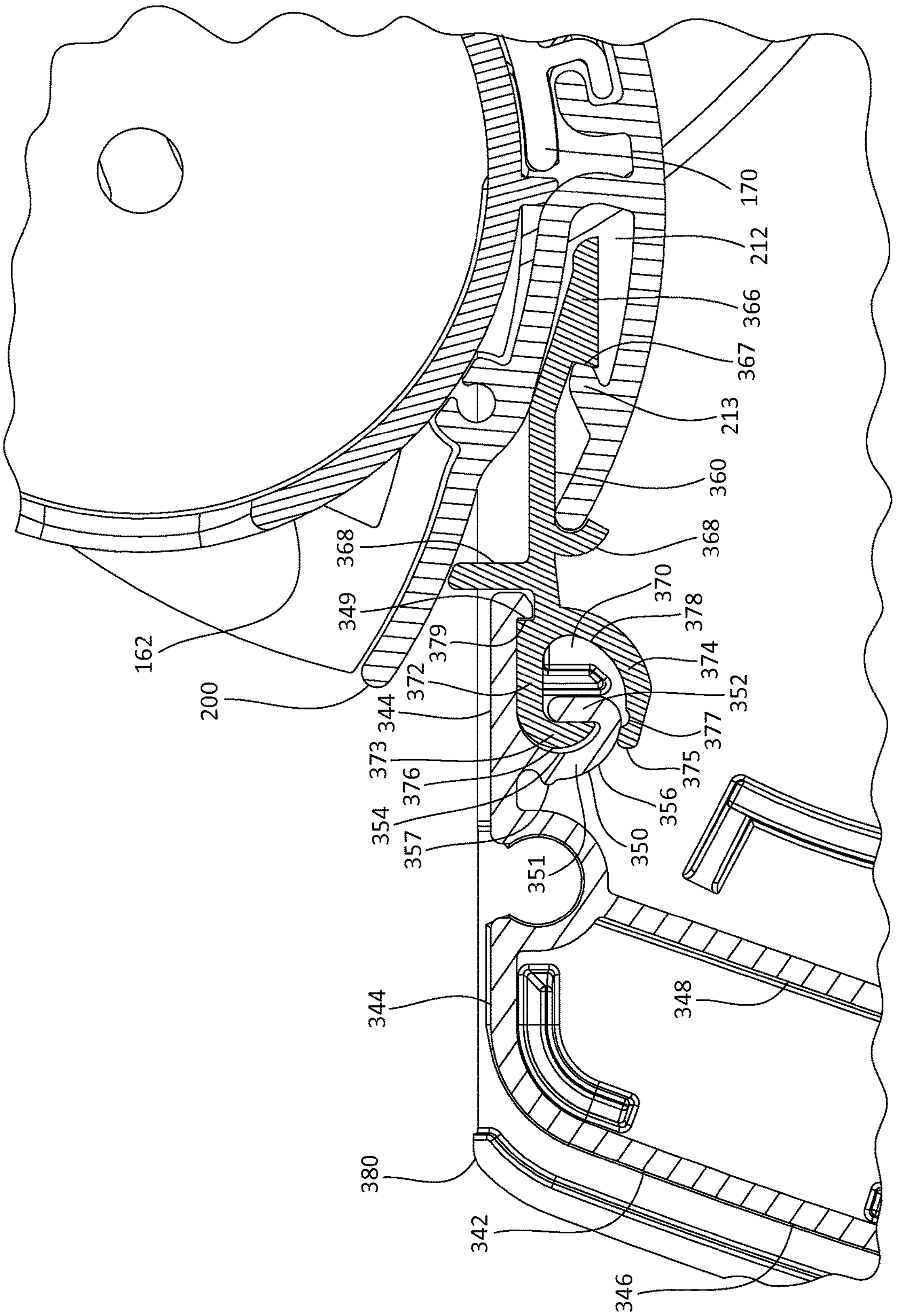
FIG. 7C is a zoomed side section view of a portion of the example battery-powered roller shade depicted in FIG. 1, with the battery compartment in an opened position and the fascia lowered.

When the fascia 330 is at rest in the reveal position (e.g., when the battery compartment 160 is in the opened position), the straight portion 352 of the projection 350 may abut the ledge 373 of the channel 370 (e.g., as shown in FIG. 7C). Additionally, the straight portion 372 of the channel 370 may abut a corresponding portion of the upper wall 344 of the cover 340. Abutment of the straight portion 352 of the projection 350 with the ledge 373, and/or abutment of the straight portion 372 of the channel 370 with the upper wall 344 of the cover 340, may cause the upper wall 344 of the cover 340 to be oriented substantially parallel to the upper wall 136 of the housing 130 when the battery compartment 160 is in the opened position (e.g., as shown in FIG. 6B).

The fascia 330 may be configured to generate a perceptible indication when the fascia 330 enters the conceal position (e.g., pivots into the conceal position). The perceptible indication may be at least one of tactile or audible. For example, the projection 350 and the channel 370 may define respective position indicators that are configured to interact with each other when the fascia 330 arrives at the conceal position, thereby generating the perceptible indication. It should be appreciated that the perceptible indication may also be generated as the fascia 330 exits the conceal position (e.g., pivots out of the conceal position).

As shown, the curved member 374 of the channel 370 defines a recess 377 that extends into the curved surface 378, proximate the free end 375. The recess 377 may be referred to as a first position indicator. The projection 350 defines a protrusion 357 that extends from the second curved surface 356, the protrusion 357 configured to be received in the recess 377. The protrusion 357 may be referred to as a second position indicator. The illustrated recess 377 defines a curved surface that is concave with respect to the curved surface 378, and the illustrated protrusion 357 defines a curved surface that is convex with respect to the second curved surface 356. It should be appreciated, however, that the first and second position indicators are not limited to the illustrated geometries.

In accordance with the illustrated fascia 330, the recess 377 may extend along the length of the channel 370 (e.g., from the first end 361 of the arm 360 to the second end 363), and the protrusion 357 may extend along the length of the projection 350 (e.g., from the first end 341 of the cover 340 to the second end 343). It should be appreciated, however, that recess 377 and the protrusion 357 are not limited to these respective configurations. For example, the arm could be alternatively configured with two or more sections of recess that are spaced apart from each other along the length of the arm, and the cover could be alternatively configured with two or more sections of protrusion that are spaced apart from each other along the length of the cover, and that correspond to the two or more sections of recess.

Interaction between the recess 377 and the protrusion 357 may generate the perceptible indication when the fascia 330 is pivoted into and/or out of the conceal position. To illustrate, as the fascia 330 is pivoted toward the conceal position (e.g., from the expose position), the portion of the curved surface 378 that is located between the recess 377 and the free end 375 of the curved member 374 may ride up and onto the protrusion 357, such that the protrusion 357 causes the curved member 374 to deflect away from the second curved surface 356 of the projection 350.

As the fascia 330 pivots into (e.g., arrives at or enters) the conceal position, the protrusion 357 may be received into the recess 377 and the curved member 374 may resiliently snap back into position against the projection 350, for instance such that the second curved surface 356 of the projection 350 once again makes contact with the curved surface 378 of the channel 370. The deflection and subsequent resilient snapping back of the curved member 374 may generate a resistive force followed by a tactile movement (e.g., a vibration) that is perceptible to an operator of the battery compartment 160 or fascia 330, and/or may create an audible clicking noise that is perceptible by the user.

The fascia 330 may be configured to generate a perceptible indication when the fascia 330 enters the expose position (e.g., pivots into the expose position). The perceptible indication may be at least one of tactile or audible. For example, the cover 340 and the arm 360 may define respective position indicators that are configured to interact with each other when the fascia 330 arrives at the expose position, thereby generating the perceptible indication. It should be appreciated that the perceptible indication may also be generated as the fascia 330 exits the expose position (e.g., pivots out of the expose position).

As shown, the straight portion 372 of the arm 360 defines a ridge 379 that is located near a lower end of the straight portion 372, near the curved member 374. The ridge 379 may be referred to as a third position indicator. The upper wall 344 of the cover 340 defines a catch 349 that extends downward from the upper wall 344. As shown, the catch 349 is configured to engage with, and subsequently abut, the ridge 379. The catch 349 may be referred to as a fourth position indicator.

In accordance with the illustrated fascia 330, the ridge 379 may extend along the length of the channel 370 (e.g., from the first end 361 of the arm 360 to the second end 363), and the catch 349 may extend along the length of the upper wall 344 (e.g., from the first end 341 of the cover 340 to the second end 343). It should be appreciated, however, that ridge 379 and the catch 349 are not limited to these respective configurations. For example, the arm could be alternatively configured with two or more sections of ridge that are spaced apart from each other along the length of the arm, and the cover could be alternatively configured with two or more sections of catch that are spaced apart from each other along the length of the cover, and that correspond to the two or more sections of ridge.

Interaction between the ridge 379 and the catch 349 may generate the perceptible indication when the fascia 330 is pivoted into and/or out of the expose position. To illustrate, as the fascia 330 is pivoted toward the expose position (e.g., from the conceal position), a corner defined by the ridge 379 may engage with a corresponding corner defined by the catch 349. As the fascia 330 pivots into (e.g., arrives at or enters) the expose position, the ridge 379 and the catch 349 may frictionally slide past each other, which may generate a resistive force followed by a tactile movement (e.g., a vibration) that is perceptible to an operator of the battery compartment 160 or fascia 330, and/or may create an audible clicking noise that is perceptible by the user.

The components of the fascia 330 may be made of any suitable material or combination of materials. For example, the cover 340, the first end cap 380, and the second end cap 390 may be made of plastic. Although the illustrated fascia 330 includes separate components, it should be appreciated that the fascia 330 may be otherwise constructed. For example, the cover 340, the first end cap 380, and the second end cap 390 may be monolithic. One or more components of the fascia 330 (e.g., one or more of the cover 340, the first end cap 380, or the second end cap 390) may be wrapped in a material (e.g., fabric), for instance to enhance the aesthetics of the fascia 330.

It should be appreciated that the fascia 330 is not limited to the illustrated interlocking connectors (e.g., to the illustrated channel 370 and projection 350), and that the fascia 330 may define any number and/or configuration of connectors that allow the cover 340 to pivot about the arm 360 when the arm 360 is attached to a component of the battery-powered roller shade 100 (e.g., the battery compartment 160), such that the fascia 330 moves away from the battery compartment 160 when the battery compartment 160 is operated from the closed position to the opened position. It should further be appreciated that the fascia 330 is not limited to the illustrated configuration of position indicators, and that the fascia 330 may define any configuration of position indicators that are capable of generating one or more perceptible indications. For example, in an alternative configuration, the channel 370 may define the protrusion and the projection 350 may define a complementary recess configured to receive the protrusion.

In an example of operating the battery compartment 160 of the battery-powered roller shade 100 from the closed position to the opened position, a force may be applied to the battery compartment 160 (e.g., to the cover 340 of the fascia 330 and/or to the cover 200, such as to the upper edge 210 of the front wall 206) to cause the battery compartment 160 to pivot about the posts 146, 156 of the housing 130. As the fascia 330 pivots out of the conceal position, the fascia 330 may generate a perceptible indication, for instance as described herein. As the battery compartment 160 pivots out of the cavity 138 about the pivot axis P1, the projections 148, 158 of the housing 130 move in the slots 186, 196 of the support 170 (e.g., from the first ends 187, 197 toward the second ends 189, 199, respectively), and the battery holder 162 gradually becomes exposed.

As the battery compartment 160 pivots forward about the pivot axis P1 (e.g., away from the housing 130), the arm 360 of the fascia 330 moves along with the battery compartment 160 and the projection 350 pivots within the channel 370 (e.g., as shown in FIG. 7B), such that the cover 340 pivots downward and away from the battery compartment 160 about the pivot axis P2, and such that the fascia 330 does not contact the roller tube 112 or the shade fabric 122. As the battery compartment 160 pivots into the opened position, the projections 148, 158 may abut the second ends 189, 199 of the slots 186, 196, and the fascia 330 may pivot into the expose position. As the fascia 330 pivots into the expose position, the fascia 330 may generate a perceptible indication, for instance as described herein. With the battery compartment 160 in the opened position (e.g., as shown in FIG. 6B), the access aperture 167 and the slot 168 are exposed, such that one or more batteries 50 may be inserted into, or removed from, the channel 166 (e.g., via the access aperture 167).

With the battery compartment 160 in the opened position, one or more batteries 50 may be replaced (e.g., if the batteries 50 are drained). A first battery 50 that is disposed at the access aperture 167 may be removed from the channel 166 by lifting the first battery 50 out of the channel 166 past the retention tabs 169. At the access aperture 167, one battery 50 at a time may be removed from the battery compartment 160, and thus from the housing 130 of the battery-powered roller shade 100, without interfering with the housing 130, the roller tube 112, or the shade fabric 122. With the first battery 50 removed, a second battery 50 may be removed from the channel 166 by sliding the second battery 50 along the channel 166 toward the access aperture 167 (e.g., by using a finger disposed in the slot 168). When the second battery 50 reaches the access aperture 167, it may be removed from the channel 166 (e.g., similarly to the first battery 50). This process of removing the second battery 50 may be repeated for one or more additional batteries 50 (e.g., all remaining batteries 50). When a desired number of batteries 50 have been removed from the channel 166, one or more fresh batteries 50 (e.g., replacement batteries) may be disposed into the channel 166 past the retention tabs 169 and slid into position in the battery holder 162 (e.g., using the slot 168). When the battery holder 162 is filled with batteries 50, the battery compartment 160 may be operated from the opened position to the closed position.

In an example of operating the battery compartment 160 from the opened position to the closed position, a force may be applied to the battery compartment 160 (e.g., to the cover 340 of the fascia 330 and/or to the cover 200, such as to the upper edge 210 of the front wall 206) to cause the battery compartment 160 to pivot about the posts 146, 156 of the housing 130. As the fascia 330 pivots out of the expose position, the fascia 330 may generate a perceptible indication, for instance as described herein. As the battery compartment 160 pivots into the cavity 138 about the pivot axis P1, the projections 148, 158 of the housing 130 move in the slots 186, 196 of the support 170 (e.g., from the second ends 189, 199 toward the first ends 187, 197, respectively), and the battery holder 162 is gradually concealed in the housing 130.

As the battery compartment 160 pivots rearward about the pivot axis P1 (e.g., toward the housing 130), the arm 360 of the fascia 330 moves along with the battery compartment 160 and the projection 350 pivots within the channel 370 (e.g., as shown in FIG. 7B), such that the cover 340 pivots upward and toward the battery compartment 160 about the pivot axis P2, and the first and second end caps 380, 390, slide past the first and second housing brackets 140, 150 respectively. As the battery compartment 160 pivots into the closed position, the projections 148, 158 may abut the first ends 187, 197 of the slots 186, 196, and the fascia 330 may pivot into the conceal position. As the fascia 330 pivots into the conceal position, the fascia 330 may generate a perceptible indication, for instance as described herein.

The battery compartment 160 may be easily operated between the closed and opened positions. For example, an individual may operate the battery compartment 160 between the opened and closed positions using a single hand. Additionally, one or more batteries 50 may be removed from, or inserted into, the battery compartment 160 using a single hand. Such one-handed operation of the battery compartment 160 may enable the individual to freely use their other hand while replacing one or more batteries 50, for instance to brace himself or herself on a ladder.

It should be appreciated that the example battery-powered roller shade 100 is not limited to use as a window treatment, and that the example battery-powered roller shade 100 may be implemented for uses other than covering one or more openings (e.g., windows). For instance, the example battery-powered roller shade 100 may be alternatively configured to function as a battery-powered, motorized projection screen (e.g., by replacing the covering material with a projection screen material).

The invention claimed is:

1. A window treatment comprising:

a housing configured to be mounted to a structure;

a battery compartment supported by the housing, the battery compartment defining a channel sized and configured to receive at least one battery, the battery compartment operable to pivot relative to the housing about a first axis between a closed position and an opened position, wherein the channel is accessible when the battery compartment is in the opened position;

a first connector fixedly coupled to the battery compartment; and a cover configured to pivot relative to the first connector about a second axis when the battery compartment is pivoted relative to the housing between the opened and closed positions.

2. The window treatment of claim 1, wherein the first connector is disposed at a first end of an arm that is fixedly coupled to the battery compartment.

3. The window treatment of claim 2, wherein the first connector is configured to interlock with a second connector of the cover.

4. The window treatment of claim 3, wherein the first connector includes a channel sized and configured to receive the second connector.

5. The window treatment of claim 4, wherein the second connector includes a projection sized and configured to be received in the channel defined by the first connector.

6. The window treatment of claim 3, wherein the first connector defines a first position indicator and the second connector defines a second position indicator, the second position indicator configured to interact with the first position indicator to generate a perceptible indication when the cover enters a conceal position.

7. The window treatment of claim 6, wherein the conceal position of the cover corresponds to a closed position of the battery compartment, and wherein the cover is configured to pivot from the conceal position to an expose position that corresponds to the opened position of the battery compartment.

8. The window treatment of claim 2, wherein a second end of the arm includes an attachment member configured to be fixedly coupled to the battery compartment.

9. The window treatment of claim 8, wherein the attachment member is configured to be disposed in a groove defined by the battery compartment.

10. The window treatment of claim 9, wherein the attachment member has a wedge shape that defines a retaining edge that is sized and configured to abut a projection in the groove.

11. The window treatment of claim 1, further comprising:

a roller tube configured to be supported by the housing; and a shade fabric having an upper end coupled to the roller tube and configured to move between a raised position and a lowered position in response to rotation of the roller tube.

12. The window treatment of claim 11, further comprising a motor drive unit configured to rotate the roller tube to adjust a position of the shade fabric.

13. A window treatment comprising:

a housing configured to be mounted to a structure;

a battery compartment that is supported by the housing, the battery compartment defining a channel sized and configured to receive at least one battery, the battery compartment operable to pivot relative to the housing about a first axis between a closed position and an opened position, wherein the channel is accessible when the battery compartment is in the opened position;

a first connector fixedly coupled to the battery compartment; and a cover including a second connector that is configured to interlock with the first connector, the cover configured to pivot relative to the first connector about a second axis when the battery compartment is pivoted relative to the housing between the opened and closed positions.

14. The window treatment of claim 13, further comprising:

a roller tube configured to be supported by the housing;

a shade fabric having an upper end coupled to the roller tube and configured to move between a raised position and a lowered position in response to rotation of the roller tube; and a motor drive unit configured to rotate the roller tube to adjust a position of the shade fabric.

15. The window treatment of claim 14, wherein the first connector includes a channel defined by a first end of an arm, a second end of the arm, the channel defined by the first end of the arm sized and configured to receive a projection of the second connector of the cover, a second end of the arm including an attachment member fixedly coupled to the battery compartment.

16. The window treatment of claim 15, wherein the first connector defines a first position indicator and the second connector defines a second position indicator, the second position indicator configured to interact with the first position indicator to generate a perceptible indication when the cover enters a conceal position.

17. The window treatment of claim 16, wherein the conceal position of the cover corresponds to a closed position of the battery compartment, and wherein the cover is configured to pivot from the conceal position to an expose position that corresponds to the opened position of the battery compartment.

18. The window treatment of claim 15, wherein the attachment member has a wedge shape that defines a retaining edge that is configured to abut a projection in a groove defined by the cover.

19. A motorized window treatment, comprising:

a housing configured to be mounted to a structure;

a battery compartment supported by the housing, the battery compartment defining a channel sized and configured to receive at least one battery, the battery compartment operable to pivot relative to the housing between a closed position and an opened position, wherein the channel is accessible when the battery compartment is in the opened position;

a first connector fixedly coupled to the battery compartment;

a cover configured to pivot relative to the first connector when the battery compartment is pivoted relative to the housing between the opened and closed positions; and a roller tube configured to be supported by the housing;

a shade fabric having an upper end coupled to the roller tube and configured to move between a raised position and a lowered position in response to rotation of the roller tube; and a motor drive unit configured to be powered by the at least one battery and to rotate the roller tube to adjust a position of the shade fabric.

20. The motorized window treatment of claim 19, wherein the first connector is formed integrally with the battery compartment, and wherein cover includes a second connector that interlocks with the first connector.

* * * * *